US011722557B2

(12) United States Patent
Yamato

(10) Patent No.: US 11,722,557 B2
(45) Date of Patent: Aug. 8, 2023

(54) OFFLOAD SERVER AND COMPUTER-READABLE MEDIUM FOR AUTOMATICALLY OFFLOADING PROCESSING TO PROGRAMMABLE LOGIC DEVICE

(71) Applicant: Nippon Telegraph and Telephone Corporation, Tokyo (JP)

(72) Inventor: Yoji Yamato, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/611,252

(22) PCT Filed: May 23, 2019

(86) PCT No.: PCT/JP2019/020493
§ 371 (c)(1),
(2) Date: Nov. 15, 2021

(87) PCT Pub. No.: WO2020/235087
PCT Pub. Date: Nov. 26, 2020

(65) Prior Publication Data
US 2022/0239729 A1   Jul. 28, 2022

(51) Int. Cl.
*H04L 67/1008* (2022.01)
*H04L 67/1097* (2022.01)

(52) U.S. Cl.
CPC ...... *H04L 67/1008* (2013.01); *H04L 67/1097* (2013.01)

(58) Field of Classification Search
CPC .......................... H04L 67/1008; H04L 67/1097
See application file for complete search history.

(56) References Cited

U.S. PATENT DOCUMENTS

| 2014/0053131 | A1* | 2/2014 | Ravi | G06F 9/5027 |
| | | | | 717/110 |
| 2018/0181398 | A1* | 6/2018 | Scherbinin | G06F 9/3017 |
| 2019/0041952 | A1* | 2/2019 | Alameldeen | G06F 1/329 |

OTHER PUBLICATIONS

Tanaka et al., "Evaluation of Optimization Method for Fortran Codes with GPU Automatic Parallelization Compiler," IPSJ SIG Technical Report, 2011, 9:1-6, (English Abstract).
Tsuchiyama, "Introduction to Open CL 1.2, Revised Edition," Impress Japan, Co., Ltd., Mar. 21, 2021, pp. 74-83 (No Translation).
Yamato et al., "A study to optimize heterogeneous resources for OpenIoT," Fifth International Symposium on Computing and Networking, Nov. 2017, CAND AR 2017:609-611, 3 pages.

(Continued)

*Primary Examiner* — Viet D Vu
(74) *Attorney, Agent, or Firm* — Fish & Richardson P.C.

(57) ABSTRACT

An offload server includes a PLD processing designation section configured to specify parallel processing or pipeline processing on a PLD by using a high-level synthesis tool including OpenCL, and a PLD processing pattern generation section configured to exclude, from loop statements to be offloaded, any iteration statement at which a compilation error occurs and to generate PLD processing patterns each of which specifies whether to perform PLD processing for each of the iteration statements at which no compilation error occurs.

8 Claims, 11 Drawing Sheets

(56) References Cited

OTHER PUBLICATIONS

Yamato et al., "Automatic GPU Offloading Technology for OpenIoT Environment," IEEE Internet of Things Journal, Sep. 2018, 10 pages.

Yamato et al., "Automatic verification technology of software patches for user virtual environments on IaaS cloud," Journal of Cloud Computing, Springer Feb. 2015, 4:4, 14 pages.

Yamato et al., "Development of Template Management Technology for Easy Deployment of Virtual Resources on OpenStack," Journal of Cloud Computing, Springer, Jun. 2014, 3:7, 12 pages.

* cited by examiner

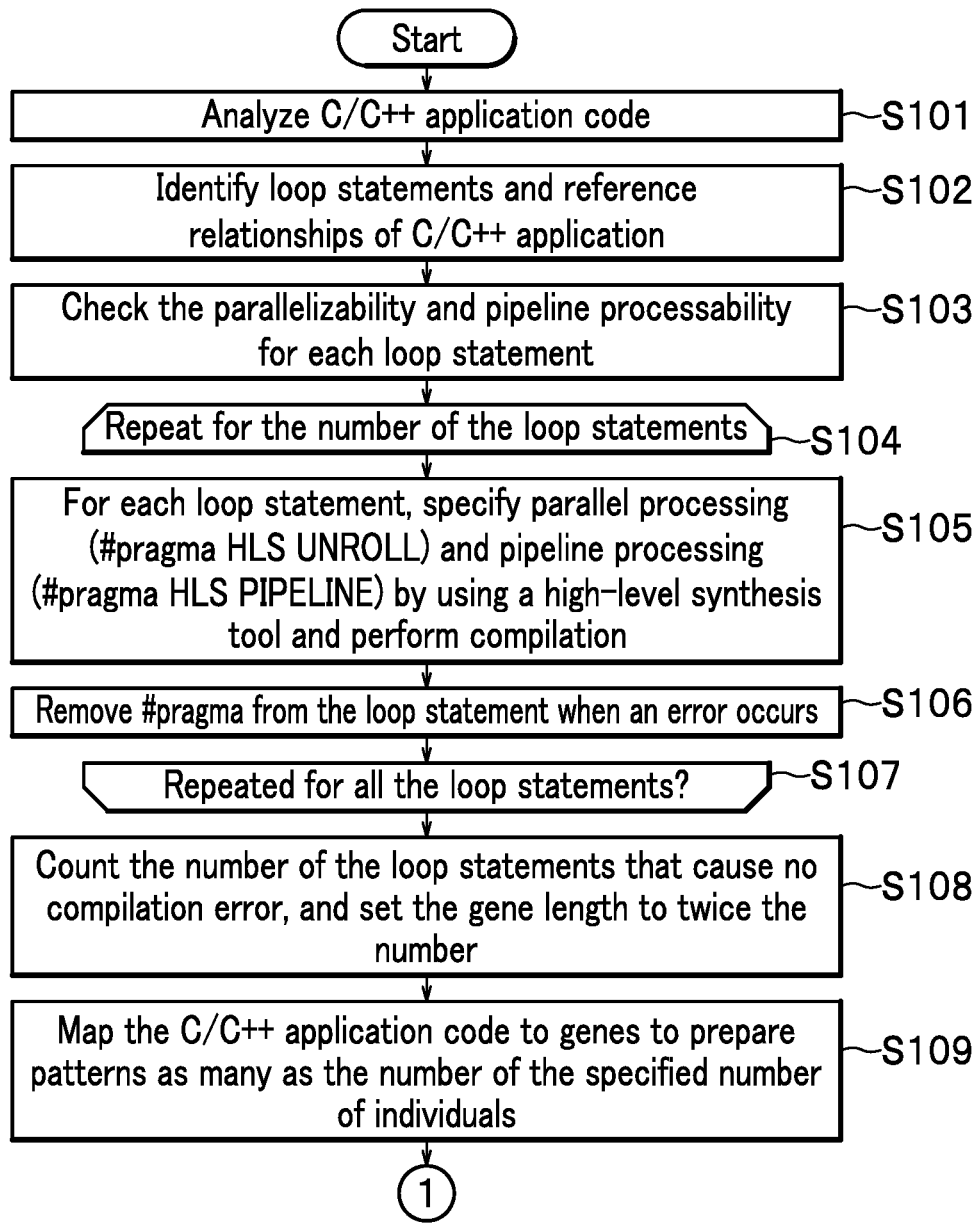

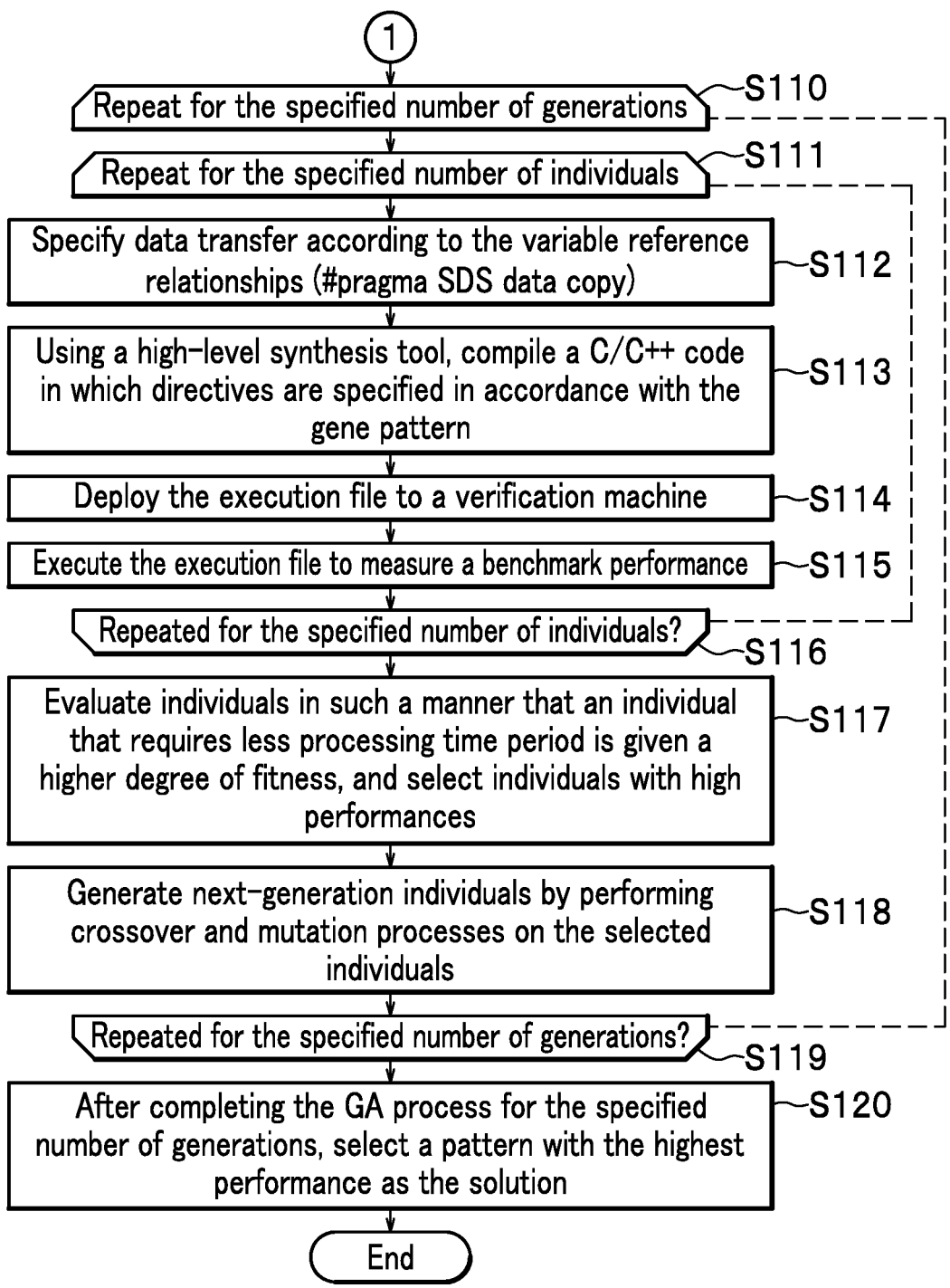

OFFLOAD SERVER AND COMPUTER-READABLE MEDIUM FOR AUTOMATICALLY OFFLOADING PROCESSING TO PROGRAMMABLE LOGIC DEVICE

CROSS-REFERENCE TO RELATED APPLICATIONS

This is a National Stage Application of PCT Application No. PCT/JP2019/020493, filed on May 23, 2019. The disclosure of the prior application is considered part of the disclosure of this application, and is incorporated in its entirety into this application.

TECHNICAL FIELD

The present invention relates to an offload server and an offload program for automatically offloading function processing to an accelerator such as an FPGA (Field Programmable Gate Array).

BACKGROUND ART

IoT (Internet of Things) technology has advanced in these years, and applications that analyze and visualize data collected at devices through a network using cloud technology have been increasingly emerging.

Conventionally, many of IoT services are silo type services in which devices, a network, and applications are integrated. However, the OpenIoT concept is attracting attentions where devices are shared by multiple applications and resources of a cloud, networks and devices are dynamically coordinated to achieve services in order to provide a wider variety of services at lower costs.

In OpenIoT, it can be expected that surveillance cameras owned by multiple entities in the street are shared and used for multiple purposes such as looking for a lost child or finding terrorists. However, using image processing of camera videos for multiple purposes in this example requires a huge amount of CPU computational resources, irrespective of on which of the device side and the cloud side the analysis is performed.

On the other hand, heterogeneous computational resources, in addition to CPUs, are used increasingly in these years in order to accommodate wide variety of fields such as IoT. For example, image processing is performed on servers that use an enhanced GPU (Graphics Processing Unit) (accelerator) and signal processing is accelerated by an FPGA (accelerator). An FPGA is a programmable gate array that can be configured by a designer or programmer after manufacture and is a type of PLD (Programmable Logic Device). Amazon Web Services (AWS) (registered trademark) provides GPU instances and FPGA instances and these resources can be used on-demand as well. Microsoft (registered trademark) is using FPGAs to increase search efficiency.

In an OpenIoT environment, a wide variety of applications are expected to be created using service integration techniques and the like, and operational applications are expected to be improved in performance by exploiting further advanced hardware. To that end, however, programming and settings adapted to the hardware to be operated are required. For example, a lot of technical knowledge regarding techniques such as CUDA (Compute Unified Device Architecture) and OpenCL (Open Computing Language) is required, making the programing and settings challenging.

OpenCL is an open API (Application Programming Interface) that can uniformly handle all computational resources (not limited to CPUs and GPUs) without being bound to specific hardware.

In order to allow GPUs and FPGAs to be readily used in user's IoT applications, the following is required: when deploying a general-purpose application such as an image processing or cryptography processing application to run in an OpenIoT environment, it is desirable that an OpenIoT platform analyze application logics and automatically offload processing to a GPU/FPGA.

CUDA, which is a development environment for GPGPU (General Purpose GPU) which uses computational capability of a GPU for other processing in addition to image processing, are evolving. CUDA is a development environment for GPGPUs. Further, OpenCL has emerged as a standard for uniformly handling heterogeneous hardware such as GPUs, FPGAs, and many-core CPUs.

In CUDA and OpenCL, programming is performed using extensions of the C programming language. However, the difficulty of such programming is high because it requires describing memory-to-memory copy/release operations between a CPU and devices like GPUs. In fact, not many engineers can make full use of CUDA and OpenCL.

There is known a technique in which, for the purpose of using a GPGPU simply, portions to be parallelized, such as loop statements, are designated in a directive-based language and a compiler compiles them into device-specific code in accordance with the directives. Technical specifications include OpenACC (Open Accelerator) and the like and compilers include PGI Compiler (registered trademark) and the like. In an example using OpenACC, a user specifies, in a code written in C/C++/Fortran language, an Open ACC directive to cause parallel processing to be performed. The PGI Compiler checks the parallelizability of the code, generates execution binaries for GPU and CPU, and converts them to execution modules. IBM JDK (registered trademark) supports a function of offloading designation of parallel processing in accordance with the lambda format of Java (registered trademark) to a GPU. Using these techniques, programmers need not be aware of, for example, data allocation to GPU memory.

In this way, offload processing to a GPU or an FPGA has been enabled by techniques such as OpenCL, CUDA and OpenACC.

CITATION LIST

Non-Patent Literature

Non-Patent Literature 1: Y. Tanaka, M. Yoshimi. M. Miki and T. Hiroyasu, "Evaluation of Optimization Method for Fortran Codes with GPU Automatic Parallelization Compiler," IPSJ SIG Technical Report, 2011(9), pp.1-6, 2011.

Non-Patent Literature 2: Y. Yamato, T. Demizu, H. Noguchi and M. Kataoka, "Automatic GPU Offloading Technology for OpenIoT Environment," IEEE Inter net of Things Journal, DOI: 10.1109/JIOT.2018.2872545, Sep. 2018.

Non-Patent Literature 3: Y. Yamato, N. Hoshikawa, H. Noguchi, T. Demizu and M. Kataoka, "A study to optimize heterogeneous resources for OpenIoT," 2017 Fifth International Symposium on Computing and Networking (CANDAR 2017), pp.609-611, Nov. 2017.

Non-Patent Literature 4: Y. Yamato, M. Muroi, K. Tanaka and M. Uchimura, "Development of Template Management Technology for Easy Deployment of Virtual Resources on OpenStack," Journal of Cloud Computing, Springer, 2014, 3:7, DOI: 10.1196/s13677-014-0007-3, June 2014.

Non-Patent Literature 5: Y. Yamato, "Automatic verification technology of software patches for user virtual environments on IaaS cloud," Journal of Cloud Computing, Springer, 2015, 4:4, DOI: 10.1196/s13677-015-0028-6, Feb. 2015.

Non-Patent Literature 6: Ryoji Tsuchiyama, "Introduction to Open CL 1.2, Revised Edition," Impress Japan, Co., Ltd., Mar. 21, 2012.

SUMMARY OF THE INVENTION

Technical Problem

The techniques such as OpenCL, CUDA and OpenACC described above have enabled offload processing to a GPU.

However, while offload processing has been enabled, there are many problems to be addressed for appropriate offloading. For example, there are compilers with automatic parallelization functions. Such compilers includes Intel compiler (registered trademark). For automatic parallelization, parallel processing portions, such as for statements (iteration statements), in a program are extracted. However, when parallel operations are caused using a GPU, it is often unable to achieve good performance due to data exchange overhead between a CPU memory and a GPU memory. To accelerate by using a GPU, a skilled person has to perform tuning in OpenCL or CUDA and to search for appropriate parallel processing portions by using PGI Compiler or the like. There is an example where every for statement in a benchmark application including a small number of for statements is tried to determine whether parallel processing is performed or not to measure performance, thereby locating most appropriate parallel processing portions (see Non-Patent Literature 1).

As can be seen from the above discussion, it is difficult for an unskilled user to improve the performance of an application by using a GPU. In addition, even when using an automatic parallelization technique, much time is taken for trial-and-error tuning to determine whether to parallelize for statements or not before starting use of the application.

The technique disclosed in Non-Patent Literature 2 fucuses on automatic extraction of appropriate parallel processing portions in an application and there are not so many applications that can be accelerated by the technique.

According to Non-Patent Literature 1, a genetic algorithm is used to automatically tune the parallel processing portions which are effectively performed by GPU processing. However, the performance of some applications cannot be improved depending on data transfer between a CPU memory and a GPU memory.

Therefore, it is difficult for an unskilled user to improve the performance of an application by using a GPU or an FPGA. In addition, in some cases, the use of an automatic parallelization technique or the like requires trial-and-error determination as to whether to parallelize and there are cases in which acceleration is not possible.

The present invention has been made in light of these circumstances and an object of the present invention is to provide an offload server and an offload program that are capable of automatically offloading specific processing of an application to a PLD while reducing the number of data transfers between a CPU and the PLD.

Means for Solving the Problem

To solve the problems described above, a first aspect of the invention is an offload server configured to offload specific processing of an application to a PLD (Programmable Logic Device), the offload server including: one or more hardware processors; an application code analysis section, implemented using one of the one or more hardware processors, configured to analyze source code of an application; a PLD processing designation section, implemented using one of the one or more hardware processors, configured to identify loop statements in the application, specify, for each of the identified loop statements, parallel processing or pipeline processing on the PLD by using a high-level synthesis tool, and perform compilation; a PLD processing pattern generation section, implemented using one of the one or more hardware processors, configured to exclude, from loop statements to be offloaded, any loop statement at which a compilation error occurs and to generate a plurality of PLD processing patterns each of which specifies whether to perform PLD processing for each of the loop statements at which no compilation error occurs; a performance measurement section, implemented using one of the one or more hardware processors, configured to, for each of the plurality of PLD processing patterns, compile the application according to the PLD processing pattern, deploy the compiled application to an accelerator verification device, and perform processing for a measurement of a performance obtained when offloading the compiled application to the PLD according to the PLD processing pattern; and an execution file generation section, implemented using one of the one or more hardware processors, configured to select a PLD processing pattern with a highest processing performance as a solution from the plurality of PLD processing patterns on the basis of a result of the measurement of the performance, and compile the application according to the PLD processing pattern with the highest processing performance to create an execution file.

This enables automatic offloading to a PLD (for example an FPGA) to which automatic offloading is difficult. For example, overall processing ability can be improved by automatically offloading specific processing of an application to an FPGA while reducing the number of data transfers between a CPU and the FPGA. This allows even a user not having the skill of using CUDA or the like to perform high-performance processing using an FPGA. Further, it is possible to improve the performance of CPU-based applications for which performance improvement using an FPGA has not been considered. Moreover, offloading to an FPGA of a general-purpose machine that is not a high-performance computation server is enabled.

A second aspect of the invention is the offload server according to the first aspect, further including a data transfer designation section, implemented using one of the one or more hardware processors, configured to analyze reference relationships between variables used in the loop statements in the application and, for data that can be transferred outside a loop, perform a data transfer designation using an explicit instruction line that explicitly specifies a data transfer outside the loop, wherein the data transfer designation section performs a data transfer designation using an explicit specification line that explicitly specifies data transfer between a CPU (Central Processing Unit) and the PLD.

By performing data transfer designations using explicit instruction lines in combination with extraction of parallel processing using a GA (Genetic Algorithm), for example, the number of data transfers from a CPU to a PLD (for example, an FPGA) or from an FPGA to a CPU can be reduced.

A third aspect of the invention is the offload server according to the second aspect. The data transfer designation section is further configured to, when a variable defined on a CPU program side is to be referenced by a PLD program side, specify a data transfer from a CPU to the PLD at the loop to be processed on the PLD or at an outer loop thereof which is an outermost loop that includes neither setting nor definition of the variable. The data transfer designation section is further configured to, when a variable set on the PLD program side is to be referenced by the CPU program side, specify a data transfer from the PLD to the CPU at the loop to be processed on the PLD or at an outer loop thereof which is an outermost loop that includes neither reference, setting, nor definition of the variable.

By explicitly specifying data transfer so that the data transfers are collectively performed at an outermost possible loop in this way, inefficient data transfer where data is transferred at every loop iteration can be avoided.

A fourth aspect of the invention is the offload server according to the first aspect, further including: a storage section, implemented using one of the one or more hardware processors, configured to include a test case database storing performance test items; and a performance measurement test extraction and execution section, implemented using one of the one or more hardware processors, configured to, after the execution file has been deployed to an actual environment for a user, extract performance test items from the test case database and execute a performance test.

In this way, performance test items can be tested by performing a performance test of automatic offloading.

A fifth aspect of the invention is the offload server according to the first aspect. The PLD processing designation section includes: an offload area extraction section, implemented using one of the one or more hardware processors, configured to identify processing offloadable to the PLD and extract an intermediate language corresponding to offload processing; and an intermediate language file output section, implemented using one of the one or more hardware processors, configured to output an intermediate language file. The performance measurement section is further configured to: deploy an execution file derived from an intermediate language to the accelerator verification device, cause the accelerator verification device to execute the deployed binary file and to perform a measurement of a performance obtained when offloading is performed, and acquire a result of the measurement of the performance of the deployed binary file and return the result to the offload area extraction section. The offload area extraction section is further configured to extract another PLD processing pattern. The intermediate language file output section is further configured to carry out a performance measurement for trial using the extracted intermediate language. The execution file generation section is further configured to: select a PLD processing pattern with a highest processing performance from the plurality of PLD processing patterns generated by the PLD processing pattern generation section and the another PLD processing pattern extracted by the offload area extraction section, on the basis of the result of the measurement of the performance obtained by repeating the performance measurement for a predetermined number of times; and compile the application according to the PLD processing pattern with the highest processing performance to generate the execution file.

By extracting an intermediate language corresponding to offload processing and outputting an intermediate language file in this way, an execution file derived from the intermediate language can be deployed. Further, extraction of an intermediate language and deployment of an execution file can be repeated to search for an appropriate offload area. This enables appropriate offload areas to be automatically extracted from a general-purpose program which does not assume parallelization.

A sixth aspect of the invention is the offload server according to the first aspect. The PLD processing designation section is further configured to set a gene length to twice the number of loop statements at which no compilation error occurs, according to a genetic algorithm. The PLD processing pattern generation section is further configured to prepare gene patterns as many as a specified number of current-generation individuals, wherein each of the gene patterns has elements whose values are each randomly assigned a value of 1 or 0 and application/non-application of PLD processing is mapped to the value in such a manner that performing PLD processing is assigned either 1 or 0 and not performing PLD processing is assigned either the opposite 0 or 1. The performance measurement section is further configured to: for each of the current-generation individuals, compile an application code in which statements specifying application of parallel processing by the PLD are specified, deploy the compiled code to the accelerator verification device, and perform processing for a measurement of a performance of the individual on the accelerator verification device. The execution file generation section is further configured to perform performance measurement for all the individuals, evaluate the individuals in such a manner that an individual that requires less processing time period is regarded as having a higher degree of fitness, select individuals having degrees of fitness higher than a predetermined value from all the individuals as individuals with high performances, generate next-generation individuals by performing crossover and mutation processes on the selected individuals, and after completing processing for a specified number of generations, select a PLD processing pattern with a highest performance as the solution.

In this way, parallelizable loop statements are checked first, then appropriate areas are searched for while repeating a performance verification trial on a group of parallelizable iteration statements in a verification environment by using the GA. By narrowing down to parallelizable loop statements (for example, for statements) and then retaining and recombining accelerable PLD processing patterns in the form of portions of genes, a pattern that can be efficiently accelerated can be searched for from a huge number of possible PLD processing patterns.

A seventh aspect of the invention is the offload server according to the sixth aspect. The offload server is connectable to an emulator. The performance measurement section is further configured to, in a stage of the genetic algorithm, use a simplified performance test using the emulator and, when determining a final result, perform verification on an actual machine and to, when a gene pattern that is identical to a former gene pattern is generated in the course of the genetic algorithm, perform verification using the emulator, thereby reducing the number of verification operations on the actual machine.

In this way, the number of verification operations on an actual machine can be reduced in a performance verification trial in a verification environment using the GA.

An eighth aspect of the invention is an offload program configured to cause a computer to function as the offload server according to the first aspect.

In this way, the functions of the offload server according to claim 1 can be implemented using a commonly used computer.

Effects of the Invention

According to the present invention, it is possible to provide an offload server and an offload program that are capable of automatically offloading specific processing of an application to a PLD while reducing the number of data transfers between a CPU and the PLD.

BRIEF DESCRIPTION OF DRAWINGS

FIG. 9A is a flowchart for explaining an operation overview of implementation of the offload server according to the embodiment.

FIG. 9B is a flowchart for explaining an operation overview of implementation of the offload server according to the embodiment.

DESCRIPTION OF EMBODIMENTS

An offload server 1 and others in a mode for carrying out the present invention (hereinafter referred to as "the present embodiment") will now be described.

As used herein, the term "CPU-to-FPGA data transfer" means a transfer of data from a CPU to an FPGA.

As used herein, the term "FPGA-to-CPU data transfer" means a transfer of data from an FPGA to a CPU.

In the following description herein, an example will be described where the present invention is applied to an FPGA (Field Programmable Gate Array) as a PLD (Programmable Logic Device). The present invention is applicable to programmable logic devices in general.

Figure 1:
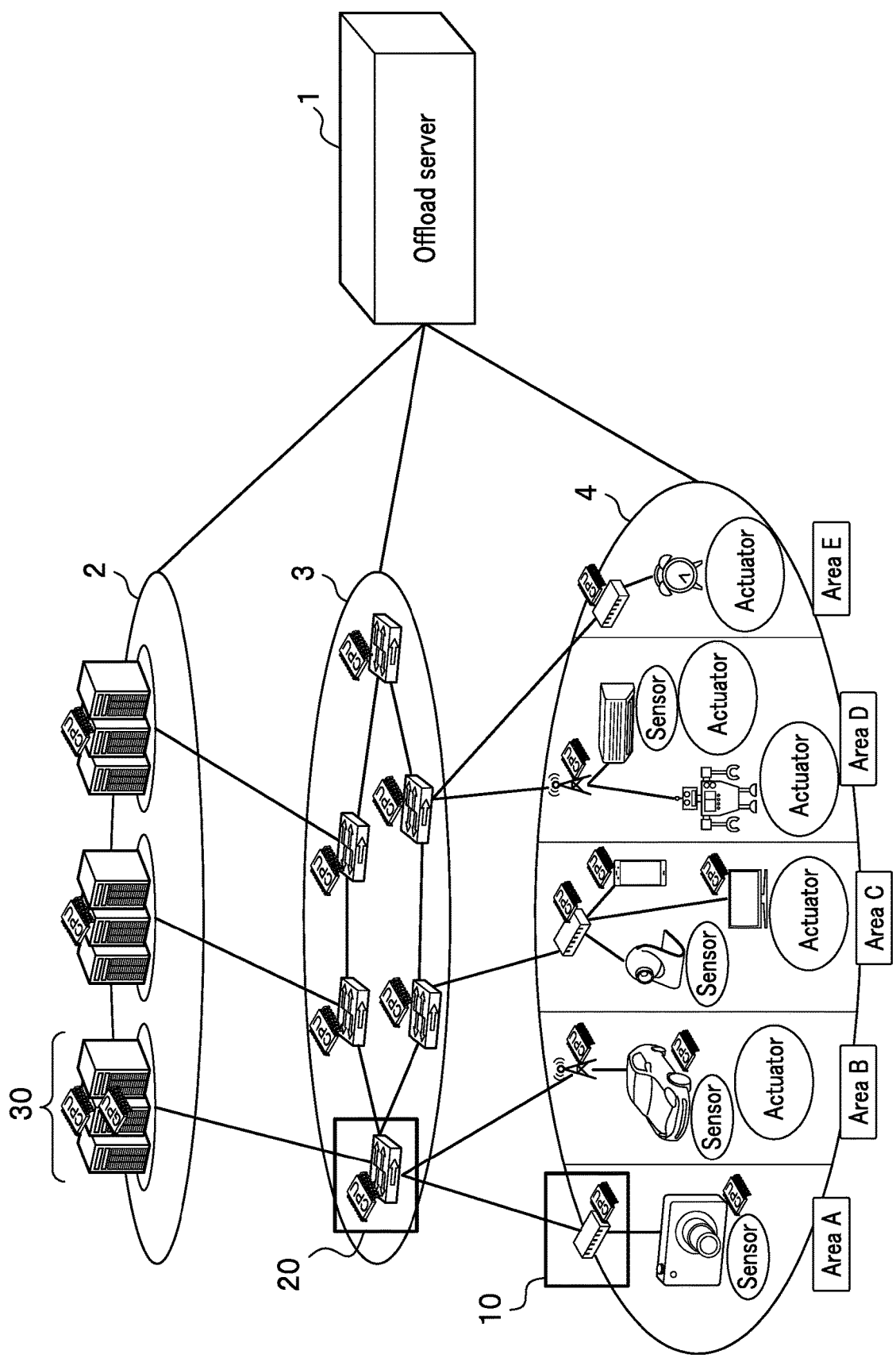
FIG. 1 is a diagram illustrating an environment adaptive software system including an offload server according to an embodiment of the present invention.

FIG. 1 is a diagram illustrating an environment adaptive software system including an offload server 1 according to the present embodiment.

The environment adaptive software system according to the present embodiment is characterized by including the offload server 1 in addition to a configuration of conventional environment adaptive software discussed in documents such as Non-Patent Literature 3. The offload server 1 is an offload server that offloads specific processing of an application to an accelerator. Further, the offload server 1 is communicatively connected to devices located in three layers, namely, a cloud layer 2, a network layer 3 and a device layer 4. Data centers 30 are deployed in the cloud layer 2, network edges 20 are deployed in the network layer 3, and gateways 10 are deployed in the device layer 4.

The environment adaptive software system including the offload server 1 according to the present embodiment achieves efficiency enhancement by appropriately performing function deployment and processing offloading in each of the device layer 4, the network layer 3, and the cloud layer 2. The environment adaptive software system achieves, primarily: function deployment efficiency enhancement for deploying functions in appropriate places in three layers to perform processes; and efficiency enhancement by offloading the functional processes, such as image analysis, to hetero hardware, such as GPUs and FPGAs. In the cloud layer, an increasing number of servers including heterogeneous HW (hardware) (hereinafter referred to as "hetero device") such as GPUs and FPGAs are used. For example, FPGAs are also used in Bing Search provided by Microsoft (registered trademark) Corporation. In this way, performance enhancement is achieved by exploiting hetero devices to offload matrix calculations and the like, for example, to a GPU and offload specific processing such as FFT (Fast Fourier Transform) computation to an FPGA.

Hereinafter, a description will be given of an example configuration in which the offload server 1 according to the present embodiment performs offload processing in the background while services for users are being used in the environment adaptive software system.

As described above, the environment adaptive software system uses an appropriate device as requested by a user to provide a service ad hoc. For example, in Non-Patent Literature 2 descried above, a watching service is accomplished that continuously monitors a person of interest by using image analysis and network cameras in the street while switching from one camera to another. In such a case, it is assumed that on the first day the service is provided to a user as trial use while offload processing of image analysis is performed in the background, then on the next day and from then on, image analysis is offloaded to an FPGA so that the watching service can be provided at a reasonable price.

Figure 2:
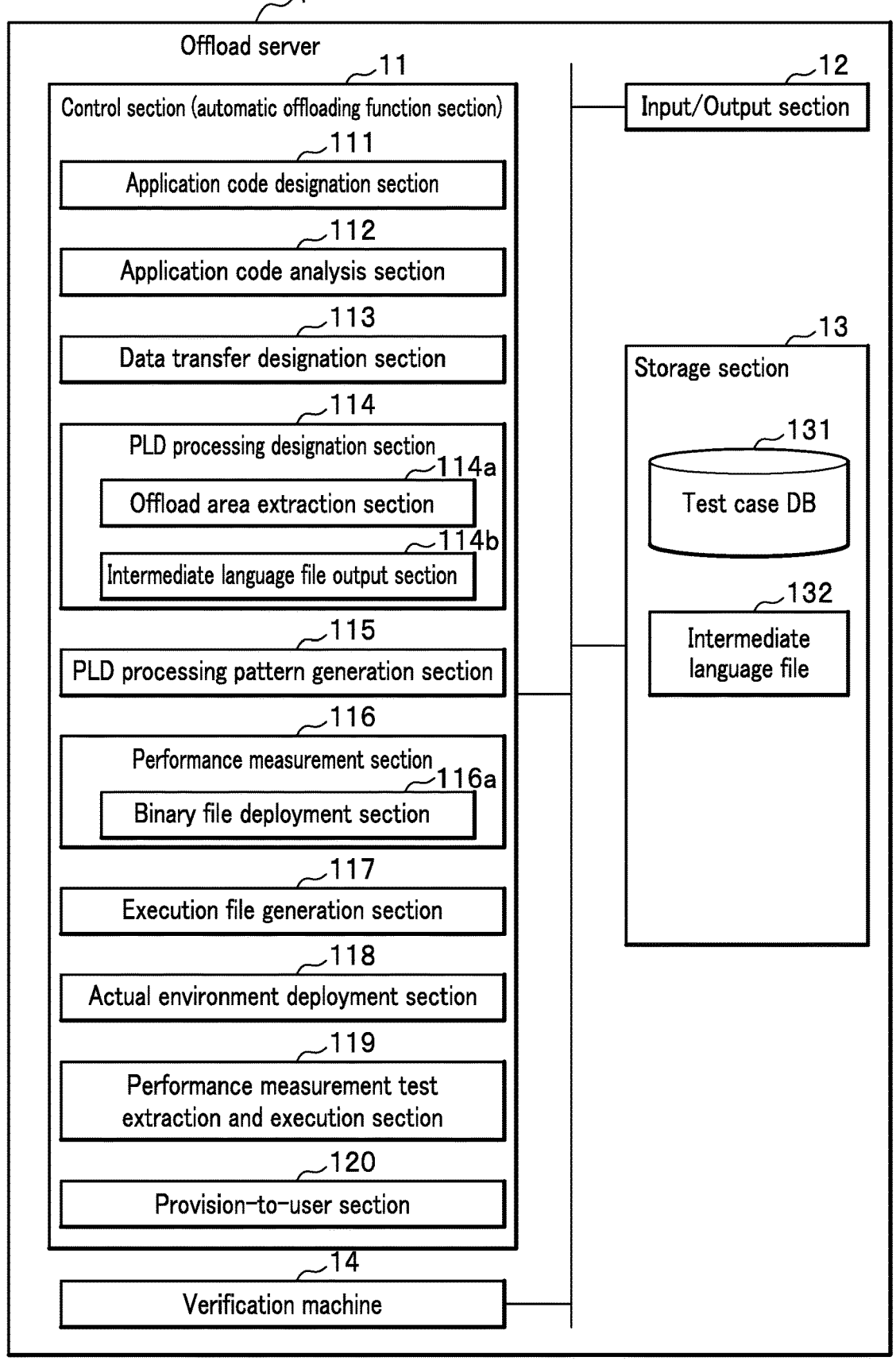
FIG. 2 is a functional block diagram illustrating an exemplary configuration of the offload server according to the embodiment.

FIG. 2 is a functional block diagram illustrating an exemplary configuration of the offload server 1 according to the embodiment of the present invention.

The offload server 1 is a device that automatically offloads specific processing of an application to an accelerator.

Further, the offload server 1 can be connected to an emulator.

As illustrated in FIG. 2, the offload server 1 includes a control section 11, an input/output section 12, a storage section 13, and a verification machine 14 (accelerator verification device).

The input/output section 12 includes a communication interface for exchanging information with devices and the like belonging to the cloud layer 2, the network layer 3 and the device layer 4, an input device such as a touch panel and a keyboard, and an input/output interface for exchanging information with an output device such as a monitor.

The storage section 13 includes a hard disk, a flash memory, a random access memory (RAM), or the like.

The storage section 13 stores a test case database (DB) 131 and temporarily stores programs (offload programs) for executing functions of the control section 11 and information (e.g., an intermediate language file 132) required for processing of the control section 11.

The test case DB 131 stores performance test items. The test case DB 131 stores information for performing a test for measuring the performance of an application to be accelerated. For example, in the case of a deep learning application for image analysis processing, sample images and test items for testing execution of the image analysis processing.

The verification machine 14 includes, as a verification environment for environment adaptive software, a CPU (Central Processing Unit), a GPU, an FPGA (accelerator), and an IoT GW (IoT device gateway).

The control section 11 is an automatic offloading function section (Automatic Offloading function) that is responsible for controlling the entire offload server 1. The control section 11 is implemented by a not-illustrated CPU loading a program (offload program) stored in the storage section 13 into the RAM and executing it, for example.

The control section 11 includes an application code designation section (specify application code) 111, an application code analysis section (analyze application code) 112, a data transfer designation section 113, a PLD processing designation section 114, a PLD processing pattern generation section 115, a performance measurement section 116, an execution file generation section 117, an actual environment deployment section (deploy final binary files to actual environment) 118, a performance measurement test extraction and execution section (extract performance test cases and run automatically) 119, and a provision-to-user section (provide price and performance to a user to judge) 120.

Application Code Designation Section 111

The application code designation section 111 performs designation in the input application code. Specifically, the application code designation section 111 identifies the processing function (such as image analysis) of the service being provided to a user.

Application Code Analysis Section 112

The application code analysis section 112 analyzes the source code of the processing function to identify structures such as loop statements and calls to an FFT library.

Data Transfer Designation Section 113

The data transfer designation section 113 analyzes the reference relationships between variables used in loop statements in the application, and, for data that can be transferred outside a loop, performs a data transfer designation using an explicit instruction line (#pragma SDS data copy(a[. . .]), where a is a variable) that explicitly specifies a data transfer outside the loop.

When a variable defined on the CPU program side is to be referenced by the FPGA program side, the data transfer designation section 113 specifies a CPU-to-FPGA data transfer at the loop to be processed on the FPGA or at an outer loop thereof which is the outermost loop that includes neither setting nor definition of the variable. When a variable set on the FPGA program side is to be referenced by the CPU program side, the data transfer designation section 113 specifies an FPGA-to-CPU data transfer at the loop to be processed on the FPGA or at an outer loop thereof which is the outermost loop that includes neither reference, setting, nor definition of the variable.

PLD Processing Designation Section 114

The PLD processing designation section 114 identifies loop statements (iteration statements) of the application, specifies parallel processing or pipeline processing on the FPGA for each of the iteration statements using a high-level synthesis tool (described later) including OpenCL, and performs compilation.

The PLD processing designation section 114 includes an offload area extraction section (extract offload area) 114a and an intermediate language file output section (output intermediate language file) 114b.

The offload area extraction section 114a identifies processing offloadable to a GPU/FPGA, such as loop statements and FFT, and extracts an intermediate language according to the offload processing.

The intermediate language file output section 114b outputs the extracted intermediate language file 132. The intermediate language extraction is not ended at one time, but is repeated for optimization through execution trials to search for appropriate offload areas.

PLD Processing Pattern Generation Section 115

The PLD processing pattern generation section 115 excludes, from loop statements to be offloaded, any loop statement (iteration statements) at which a compilation error occurs and generates a plurality of PLD processing patterns each of which specifies whether to perform PLD processing for each of the iteration statements at which no compilation error occurs.

Performance Measurement Section 116

The performance measurement section 116 compiles the application according to the PLD processing pattern, deploys the compiled application to the verification machine 14, and performs processing for measuring the performance obtained when offloading the compiled application to the PLD according to the PLD processing pattern.

The performance measurement section 116 includes a binary file deployment section (deploy binary files) 116a. The binary file deployment section 116a deploys an execution file derived from the intermediate language to a verification machine 14 equipped with GPUs and FPGAs.

The performance measurement section 116 executes the deployed binary file, measures the performance obtained when offloading is performed and returns the result of the performance measurement to the offload area extraction section 114a. In this case, the offload area extraction section 114a extracts another PLD processing pattern, and the intermediate language file output section 114b carries out a performance measurement for trial based on extracted intermediate language (see reference character e in FIG. 3, which will be described later).

Execution File Generation Section 117

The execution file generation section 117 selects a PLD processing pattern with a highest processing performance from the plurality of PLD processing patterns generated by the PLD processing pattern generation section 115 and the another PLD processing pattern extracted by the offload area extraction section 114a, on the basis of the result of the performance measurement repeated for a predetermined number of times and compiles the application according to the PLD processing pattern with the highest processing performance to generate an execution file.

Actual Environment Deployment Section 118

The actual environment deployment section 118 deploys the generated execution file to the actual environment for user ("deployment of final binary file to actual environment"). The actual environment deployment section 118 determines a pattern that designates the final offload areas, and deploys the pattern to the actual environment for the user.

Performance Measurement Test Extraction and Execution Section 119

After the execution file is deployed, a performance measurement test extraction and execution section 119 extracts performance test items from the test case DB 131 and performs a performance test ("deployment of final binary file to actual environment").

After the execution file is deployed, the performance measurement test extraction and execution section 119 extracts performance test items from the test case DB 131, and performs an automatic execution of the extracted performance test in order to indicate the performance to the user.

Provision-to-User section 120

The provision-to-user section 120 presents, to the user, information on the price, performance and the like based on the result of the performance test ("provision of information on price, performance and the like to user"). The test case DB 131 stores data for automatically performing the test for measuring the performance of the application. The provision-to-user section 120 presents, to the user, the result of the execution of the test data of the test case DB 131 and the price of the entire system, which is determined from the unit prices of the resources (e.g., virtual machines, FPGA instances and GPU instances) used in the system. On the basis of the presented information on the price, performance and the like, the user determines whether to start using the service with billing. Here, the known technique disclosed in Non-Patent Literature 4 may be used for collective deployment to the actual environment, and the known technique disclosed in Non-Patent Literature 5 may be used for the automatic performance test.

[Application of Genetic Algorithm]

The offload server 1 can use an evolutionary computation technique such as GA to optimize offloading. A configuration of the offload server 1 using a GA is as follows.

Specifically, the PLD processing designation section 114 uses the number of loop statements (iteration statements) at which no compilation error occurs as the gene length, according to a genetic algorithm. The PLD processing pattern generation section 115 maps accelerator processing availability to a gene pattern in such a manner that performing accelerator processing is assigned either 1 or 0 and not performing accelerator processing is assigned either the opposite 0 or 1.

The PLD processing pattern generation section 115 prepares as many gene patterns as the specified number of individuals, wherein values of genes of gene patterns are randomly set as either 1 or 0. The performance measurement section 116 compiles, according to each of the individuals, an application code in which statements specifying application of parallel processing by an accelerator are specified and deploys the compiled code to the verification machine 14. The performance measurement section 116 performs processing for measuring the performance on the verification machine 14.

When a gene having the same PLD processing pattern as a former gene appears in an intermediate generation, the performance measurement section 116 does not perform compilation of the application code corresponding to the PLD processing pattern and does not perform performance measurement and uses the same performance measurement value. Alternatively, the performance may be measured using an emulator.

In addition, for an application code that causes a compilation error and for an application code with which the performance measurement does not finish within a predetermined time, the performance measurement section 116 handles these cases as time-out cases and sets the performance measurement value to a predetermined time (a long time).

The execution file generation section 117 performs the performance measurement for all the individuals and evaluates them in such a manner that an individual with a shorter processing time is judged as having a higher degree of fitness. The execution file generation section 117 selects, from all the individuals, individuals having degrees of fitness higher than a predetermined value as individuals with high performance and performs crossover and mutation processes on the selected individuals to generate individuals of the next generation. Examples of the selection method include a roulette-wheel selection in which the probability of selection is in proportion to the degree of fitness. After processing for a specified number of generations has been completed, the execution file generation section 117 selects a PLD processing pattern with a highest performance as the solution.

An automatic offloading operation of the offload server 1 configured as described above will be described below.

Automatic Offload Operation

The offload server 1 according to the present embodiment is an example applied to FPGA automatic offloading of a user application logic as elemental technology of environment adaptive software.

Figure 3:
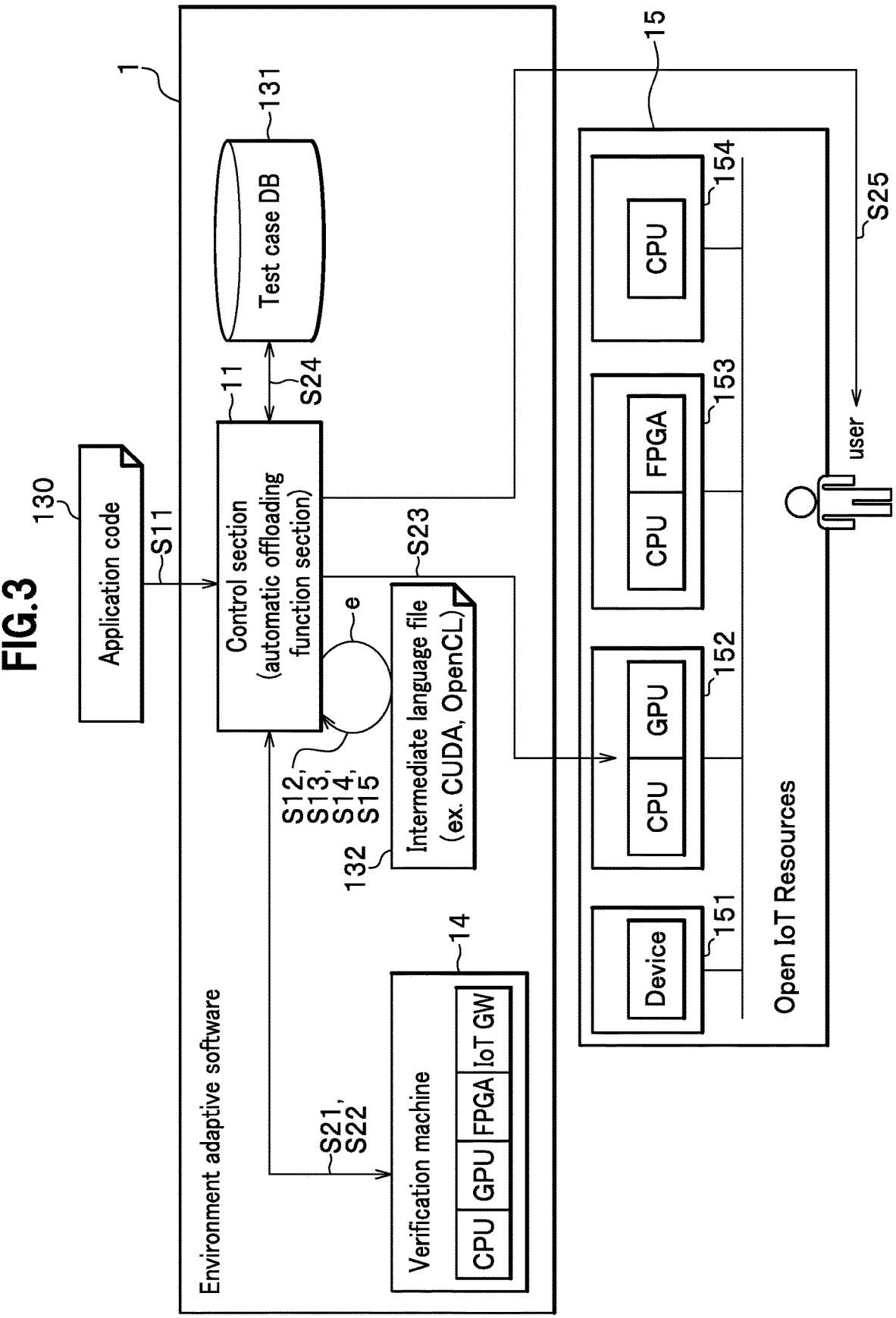
FIG. 3 is a diagram illustrating automatic offloading processing using a GA of the offload server according to the embodiment.

FIG. 3 is a diagram illustrating automatic offloading processing using a GA of the offload server.

As illustrated in FIG. 3, the offload server 1 is applied to elemental technology of environment adaptive software. The offload server 1 includes a control section (automatic offloading function section) 11, a test case DB 131, an intermediate language file 132, and a verification machine 14.

The offload server 1 acquires application code 130 used by a user.

The user uses OpenIoT resources 15. The OpenIoT resources 15 include, for example, various types of devices 151 including a CPU-GPU-equipped device 152, a CPU-FPGA-equipped device 153, and a CPU-equipped device 154. The offload server 1 automatically offloads functional processes to an accelerator of the CPU-GPU-equipped device 152 and to an accelerator of the CPU-FPGA-equipped device 153.

Operations of each section will be described with reference to the step numbers in FIG. 3.

Step S11: Specify Application Code

At step S11, the application code designation section 111 (see FIG. 2) identifies the processing function (such as image analysis) of the service being provided to the user. Specifically, the application code designation section 111 performs designation in the input application code.

Step S12: Analyze Application Code

At step S12, the application code analysis section 112 (see FIG. 2) analyzes source code of the processing function and identifies structures such as loop statements and calls to an FFT library.

Step S13: Extract Offload Area

At step S13, the PLD processing designation section 114 (see FIG. 2) identifies loop statements (iteration statements) of the application, specifies parallel processing or pipeline processing on an FPGA for each of the iteration statements using a high-level synthesis tool (described later) including OpenCL, and performs compilation. Specifically, the offload area extraction section 114a (see FIG. 2) identifies processing offloadable to a GPU and/or an FPGA, such as loop statements and FFT processing, and extracts an intermediate language according to the offload processing.

Step S14: Output Intermediate Language File

At step S14, the intermediate language file output section 114b (see FIG. 2) outputs the intermediate language file 132. The intermediate language extraction is not ended at one time, but is repeated for optimization through execution trials to search for appropriate offload areas.

Step S15: Create PLD processing Pattern

At step S15, the PLD processing pattern generation section 115 (see FIG. 2) excludes, from loop statements to be offloaded, any loop statement at which a compilation error occurs and generates a plurality of PLD processing patterns each of which specifies whether to perform parallel processing for each of the iteration statements at which no compilation error occurs.

Step S21: Deploy Binary Files

At step S21, the binary file deployment section 116a (see FIG. 2) deploys an execution file derived from an intermediate language corresponding to an PLD processing pattern to the verification machine 14 including a GPU, an FPGA, and an IoT GW. The binary file deployment section 116a launches the deployed file and executes an assumed test case to measure the performance obtained when offloading is performed.

Step S22: Measure Performances

At step S22, the performance measurement section 116 (see FIG. 2) executes the deployed file to measure the performance obtained when offloading is performed.

In order to make offload areas more appropriate, the result of the performance measurement is returned to the offload area extraction section 114a. Then, the offload area extraction section 114a extracts another pattern. Then, the intermediate language file output section 114b carries out a performance measurement for trial using the extracted intermediate language (see reference character e in FIG. 3). The performance measurement section 116 repeats the performance measurement on the verification environment and determines a final code pattern to deploy.

As indicated by reference character e in FIG. 3, the control section 11 repeatedly executes the above-described steps from step S12 to step S22. The automatic offloading function of the control section 11 is summarized as follows. The PLD processing designation section 114 identifies loop statements (iteration statements) of the application, specifies parallel processing or pipeline processing on the FPGA for each of the iteration statements using a high-level synthesis tool including OpenCL, and performs compilation. Then, the PLD processing pattern generation section 115 excludes, from loop statements to be offloaded, any loop statement at which a compilation error occurs and generates a plurality of PLD processing patterns each of which specifies whether to perform PLD processing for each of the loop statements at which no compilation error occurs. Then, for each of the plurality of PLD processing patterns, the binary file deployment section 116a compiles the application according to the PLD processing pattern and deploys the compiled application to the verification machine 14, and the performance measurement section 116 performs processing for measuring the performance on the verification machine 14. The execution file generation section 117 selects a PLD processing pattern with the highest processing performance from all the PLD processing patterns subjected to the performance measurement on the basis of the result of the performance measurement repeated for a predetermined number of times and compiles the application according to the selected PLD processing pattern to generate an execution file.

Step S23: Deploy Final Binary Files to Actual Environment

At step S23, the actual environment deployment section 118 determines a pattern that designates the final offload areas, and deploys the pattern to the actual environment for the user.

Step S24: Extract Performance Test Cases and Run Automatically

At step S24, after the execution file is deployed, the performance measurement test extraction and execution section 119 extracts performance test items from the test case DB 131, and performs an automatic execution of the extracted performance test in order to indicate the performance to the user.

Step S25: Provide Price and Performance to a User to Judge

At step S25, the provision-to-user section 120 presents, to the user, information on the price, performance and the like based on the result of the performance test. On the basis of the presented information on the price, performance and the like, the user determines whether to start using the service with billing.

The above-described steps from step S11 to step S25 are performed in the background of service use of the user, and are assumed to be performed on the first day of temporary use of the service, for example. Further, in order to reduce the cost, the processing to be performed in the background may be performed only for offloading to a GPU/FPGA.

As described above, when the offload server 1 is applied to an elemental technology of environment adaptive software, the control section (automatic offloading function section) 11 of the offload server 1 extracts the areas to be offloaded from the source code of the application used by the user and outputs an intermediate language, in order to offload functional processing (steps S11 to S15). The control section 11 deploys the execution file derived from the intermediate language to the verification machine 14 and causes the verification machine 14 to execute the execution file to verify the effect of offloading (steps S21 to S22). The control section 11 repeats the verification, then determines appropriate offload areas, and then deploys the execution file to an actual environment that is actually provided to the user, to provide the execution file as a service (steps S23 to S25).

The processing flow of collectively performing the code conversion, the resource amount adjustment, and the deployment place adjustment, which are required for environment adaptation, has been described. However, it should be noted that this is not limiting and only desired processing may be extracted. For example, when only a code conversion is desired to be performed for an FPGA, it is possible to use only the environment adaptation function and the verification environment in the steps S11 to S21.

[Automatic Offloading to FPGA]

The above-described code analysis uses a syntax analysis tool, such as Clang mentioned later, to analyze the application code. It is difficult to generalize the code analysis because the analysis needs to take into consideration a device to which offloading is performed. However, it is possible to identify the structure of code such as reference relationships between loop statements and variables and to identify functional blocks that perform FFT processing or calls to a library that performs FFT processing. It may be difficult for the offload server to automatically identify such functional blocks. Such functional blocks can be identified through similarity determination using a similar code detection tool such as CCFinderX. Clang is a tool for C/C++. A tool that is appropriate for the language to be analyzed need to be selected.

Further, when processing of an application is to be offloaded, consideration is required depending on the offload destination device, such as a GPU, FPGA, or IoT GW. In general, it is difficult to automatically find a setting that results in the maximum performance on the first try. Therefore, offload patterns are tried several times in a verification environment while repeating performance measurement, thereby finding a pattern that can achieve acceleration.

A description will be given below of a method for offloading loop statements in application software to an FPGA.

There are a wide variety of applications. For example, a computationally intensive application such as image processing for video analysis or machine learning for sensor data analysis contain many iterations. Therefore, loop statements in an application are automatically offloaded to an FPGA, thereby improving the speed.

In order to improve the speed, appropriate parallel processing or pipeline processing is required as described in the Background Art section. When an FPGA is used in particular, it is often the case that when the data size and the number of loop iterations are small, performance cannot be improved due to memory transfer between a CPU and the FPGA. Further, due to a memory process design and/or timing of memory data transfer, a combination of individual loop statements that can be accelerated by parallel processing or pipeline processing may not result in the highest speed. For example, even if the first, fifth and tenth for statements among 10 for statements (iteration statements) can achieve acceleration compared to using the CPU, the combination of the three for statements does not necessarily be the highest speed option.

In the case of a GPU, designated loop statements can be executed by the GPU by specifying #pragma acc kernels using OpenACC (for Open ACCelerators). OpenACC can simplify programming of parallel computing (for example CPU/GPU system parallelism).

In contrast, in the case of an FPGA, 13-step coding described below need to be performed for execution for example in OpenCL (see Non-Patent Literature 6: "Introduction to OpenCL", pp.74-83).

A kernel created according to the grammar of OpenCL C programming language is executed on a device (for example, an FPGA) by a host side program (e.g., CPU side program) written using a runtime API of OpenCL C programming language. A portion that calls the kernel function hello( )from the host calls clEnqueueTask( ) which is one of the OpenCL runtime APIs.

The basic flow of initialization, execution, and termination of OpenCL, written in a host code, is described below as step 1 through step 13. Step 1 through step 10 in step 1 through step 13 are a procedure (preparation) before calling the kernel function hello( )from the host and the kernel is executed in step 11.

1. Platform Identification

A platform on which OpenCL operates is identified using function clGetPlatformIDs( ) which is defined in OpenCL runtime API to provide a platform identification function.

2. Device Identification

A device, e.g., a GPU, used on the platform is identified using function clGetDeviceIDs( ) which is defined in OpenCL runtime API to provide a device identification function.

3. Context Creation

An OpenCL context, which is an execution environment to run OpenCL, is created using function clCreateContext( ) which is defined in OpenCL runtime API to provide a context creation function.

4. Command Queue Creation

A command queue is created to be ready for controlling the device, using function clCreateCommandQueue( ) which is defined in OpenCL runtime API to provide a command queue creation function. In OpenCL, actions (issuances of kernel execution commands and host-device memory copy commands) from a host to a device are performed through a command queue.

5. Memory Object Creation

A memory object that allows the host to reference the memory object is created using function clCreateBuffer( ) which is defined in the OpenCL runtime API to provide the ability to allocate memory on the device.

6. Kernel File Reading

The host program controls execution of a kernel executed on the device. Therefore, the host program first needs to read kernel programs. Kernel programs include binary data created by OpenCL compiler and source code written in OpenCL C programming language. These kernel files are read (detailed description of which is omitted). It should be noted that the OpenCL runtime API is not used when reading kernel files.

7. Program Object Creation

In OpenCL, a kernel program is recognized as a program project. This procedure is the program object creation.

A program object that allows the host to reference the memory object is created using function clCreateProgramWithSource( ), which is defined in the OpenCL runtime API to provide a function of creating a program object. When the program object is to be created from a compiled binary sequence of a kernel program, clCreateProgramWithBinary( )is used.

8. Build

OpenCL C compiler/linker is used to build the program object registered as source code.

The program object is built using function clBuildProgram( ), which is defined in the OpenCL runtime API to perform a build by the OpenCL C compiler/linker. It should be noted that if the program object has been generated from a compiled binary sequence by using clCreateProgramWithBinary( ), this compile procedure is not needed.

9. Kernel Object Creation

Kernel objects are created using function clCreateKernel( ), which is defined in the OpenCL runtime API to provide the ability to create a kernel object. A kernel function name (hello) is specified when creating a kernel object because one kernel object corresponds to one kernel function. Further, when a plurality of kernel functions are written as one program object, clCreateKernel( )is called multiple times because one kernel object corresponds to one kernel function on a one-to-one basis.

10. Kernel Argument Setting

Kernel arguments are set using function clSetKernel( ), which is defined in the OpenCL runtime API to provide the ability to provide arguments to a kernel (to pass values to arguments of the kernel function).

The above-described steps 1 through 10 completes the preparation, and the processing flow proceeds to step 11, where the kernel is executed on the device from the host.

11. Kernel Execution

Kernel execution (queueing to the command queue) is a queueing function to the command queue because the kernel execution is an action to the device.

A command to execute the kernel hello on the device is queued using function clEnqueueTask( ), which is defined in the OpenCL runtime API to provide the ability to execute a kernel. After the command to execute the kernel hello is queued, the command is executed on an arithmetic operation unit that can execute the command on the device.

12. Read from Memory Object

Data is copied from a memory area of the device to a memory area of the host using function clEnqueueReadBuffer( ), which is defined in the OpenCL runtime API to provide the ability to copy data from a memory of a device to a memory of a host. In addition, data is copied from a memory area on the host side to a memory area on the device side using function clEnqueueWriteBuffer( ), which provides the ability to copy data from the host side to a memory on the device side. It should be noted that because these functions are actions to the device, the copy command is first queued into the command queue, then the data copy starts.

13. Object Release

Lastly, the various objects having been created are released.

Device execution by the kernels created in accordance with the OpenCL C programming language has been described above.

High-level Synthesis Tools other than OpenCL

While FPGA processing can be performed using OpenCL or HDL (Hardware definition language), the processing can also be performed using a more abstract high-level synthesis tool.

High-level synthesis tools other than OpenCL will be described.

High-level synthesis tools other than OpenCL include Vivado HLS (registered trademark) from Xilinx Corporation and Intel HLS Compiler (registered trademark) from Intel Corporation.

When Vivado HLS is used, pipeline processing and parallelization processing can be specified using #pragma as with the case of GPU (see FIG. 4 described later).

Specifications of High-level synthesis tools significantly vary from vender to vendor. For example, in the case of Vivado from Xilinx Corporation, FPGA processing can be specified using directives such as #pragma HLS PIPELINE and #pragma HLS UNROLL, which are similar to those in OpenACC. In this case, #pragma HLS PIPELINE is associated with odd number genes while #pragma HLS UNROLL is associated with even number genes (see FIG. 4 described later).

Parallel processing by a GPU and parallelism in the case of FPGA will be described next.

When loop statements are offloaded to a GPU, a strict check is performed to determine whether parallel processing can be applied or not because only parallel processing can be performed. Therefore, if there is a dependency between loops, a compilation error is issued.

On the other hand, in the case of FPGA, when parallel processing cannot be performed, pipeline processing may be performed in an FPGA execution environment to improve the speed. Thus, by combining parallel processing and pipeline processing, more loops can be actually offloaded compared with the case of GPU.

[Concept of Search Process by Control Section (Automatic Offloading Function Section) 11 using Simple GA]

Figure 4:
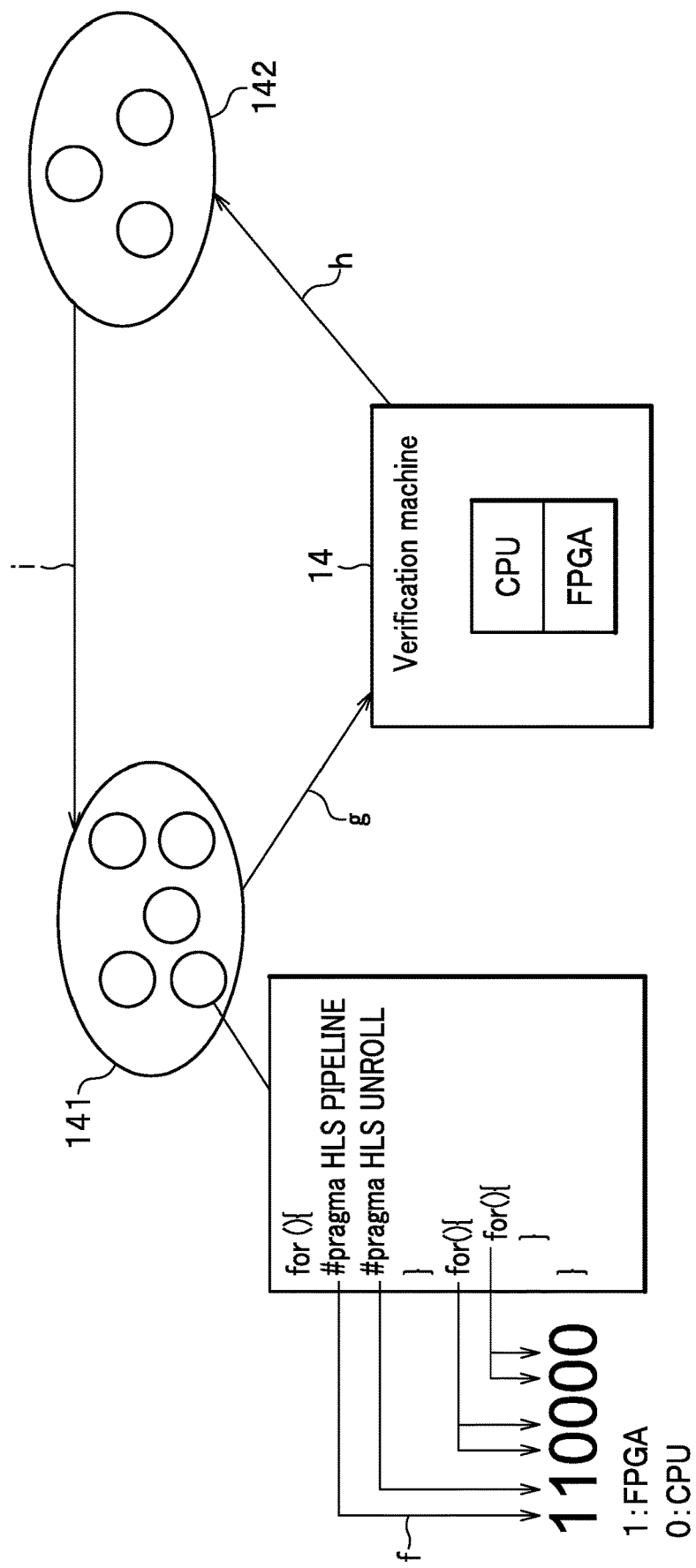
FIG. 4 is a diagram illustrating a concept of a search process by a control section (automatic offloading function section) using Simple GA of the offload server according to the embodiment.

FIG. 4 is a diagram illustrating a concept of a search process by a control section (automatic offloading function section) 11 using Simple GA. FIG. 4 illustrates the concept of the search process and illustrates gene sequence mapping of for statements.

We take an example in which a high-level synthesis tool (#pragma HLS PIPELINE/ #pragma HLS UNROLL) is used to specify FPGA processing.

GA is a combination optimization technique that mimics the evolutionary process of living organisms. The flowchart of the GA is: initialization→evaluation→selection→crossover →mutation→termination judgement.

In the present embodiment, Simple GA, which uses simplified processing, will be used among GAs. Simple GA is a simplified GA, in which a gene consists only of 1's and 0's, roulette wheel selection and single-point crossover are employed, and mutation is performed by flipping the value of the gene in one position from 1 to 0 or vice versa.

Initialization

In the initialization, the parallelizability of all the for statements in the application code is checked and then the for statements that can be parallelized are mapped to a gene sequence. When FPGA processing is to be performed, 1 is set while when FPGA processing is not to be performed, 0 is set. #pragma HLS PIPELINE is associated with odd number genes and #pragma HLS UNROLL is associated with even number genes.

The genes are prepared for a specified M number of individuals in such a manner that one for statement is assigned a value of 1 or 0 randomly.

Specifically, the control section (automatic offloading function section) 11 (see FIG. 2) acquires application code 130 (see FIG. 3) used by the user and checks the parallelizability of the for statements on the basis of the code patterns 141 of the application code 130 as illustrated in FIG. 4. When three for statements are found in the code patterns 141 as illustrated in FIG. 4 (see reference character f in FIG. 4), each for statement is assigned two digits which are assigned either 1 or 0 randomly, and as a result six digits which are assigned either 1 or 0 randomly are assigned to the three for statements. For example, a value of 0 is assigned for the cases in which the processing is performed by the CPU, and a value of 1 is assigned for the cases in which processing is outsourced to the GPU. At this stage, however, a value of 1 or 0 is randomly assigned.

Code corresponding to a gene length consists of 6 digits and there are $2^6=64$ patterns of code with a gene length of 6 digits, for example: 110001, 110010, . . . and so on. It should be noted that circles in the code pattern 141 conceptually represent the code in FIG. 4.

Evaluation

In the evaluation, deployment and performance measurement are performed (see reference character g in FIG. 4). Specifically, the performance measurement section 116 (see FIG. 2) compiles code corresponding to genes, deploys the compiled code to the verification machine 14, and executes the deployed code. The performance measurement section 116 performs a benchmark performance measurement. A gene corresponding to a pattern (PLD processing pattern) with good performance is given a higher degree of fitness.

Selection

Figure 5:
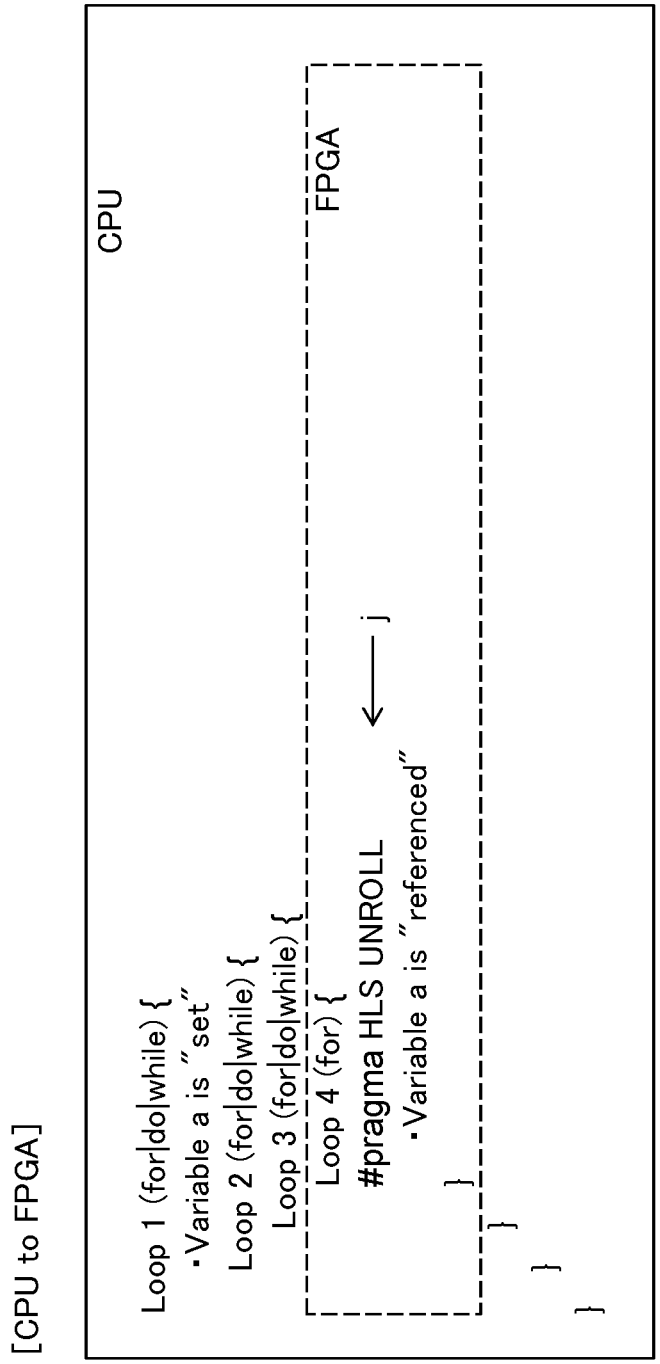
FIG. 5 is a diagram illustrating an exemplary case of loop statements involving a CPU-to-FPGA data transfer in an application example 1 of the offload server according to the embodiment, in which loop statements a variable set on the CPU program side is referenced by the FPGA program side.

In the selection, on the basis of the degree of fitness, high performance code patterns are selected (see reference character h in FIG. 5). The performance measurement section 116 (see FIG. 2) selects a specified number of genes with high degrees of fitness, on the basis of the degrees of fitness. The present embodiment performs roulette-wheel selection according to the degree of fitness and elite selection of selecting the gene with the highest degree of fitness.

FIG. 4 illustrates, as the concept of the search process, that the number of circles in selected code patterns 142 has decreased to three.

Crossover

In the crossover, some of the genes are swapped between selected individuals at one point at a certain crossover rate Pc to generate child individuals.

A gene of a certain pattern (PLD processing patter) selected by roulette-wheel selection is crossed with a gene of another pattern. The position of the one-point crossover is arbitrary; for example, the crossover point may be the third digit in the six-digit code described above.

Mutation

In the mutation, values of a gene of an individual are changed from 0 to 1 or 1 to 0 at a certain mutation rate Pm.

Further, in order to avoid a local solution, mutation is introduced. It should be noted that, in some modes, mutation may be omitted in order to reduce the amount of computation.

Termination Judgement

As illustrated in FIG. 4, next-generation code patterns are generated after the crossover and mutation are performed (see reference character i in FIG. 4).

In the termination judgement, the process is terminated after the process is repeated a number of times equal to a specified T number of generations, and a gene with the highest degree of fitness is selected as the solution.

For example, performance measurement is performed and three fast patterns, 110010, 011001, and 010101 are selected. The three patterns are recombined in the next generation using the GA to generate a new pattern (PLD processing pattern) 110101 (an example). Here, mutation is introduced into the recombined patterns by, for example, automatically replacing 0 with 1. This process is repeated to find the fastest pattern. The specified number of generations (for example 20 generations) is defined and a pattern left in the last generation is selected as the final solution.

Deployment

With a PLD processing pattern having a highest performance corresponding to the gene with the highest degree of fitness, the deployment to the actual environment is performed anew to provide it to the user.

Supplemental Remarks

Deployment is performed on the verification machine 14 and, in the case of image processing, for example, the image processing is tested by benchmark testing and code patterns resulting in shorter processing time are evaluated as having a higher degree of fitness. For example, the evaluation is given as an inverse of the processing time. A value of 1 is given to processing that takes 10 seconds; and a value of 0.1 is given to processing that takes 100 seconds.

For example, three to five code patterns with higher degrees of fitness are selected from 10 code patterns and recombined to generate new code patterns. In the course of the generation, a code pattern that is identical to a former gene pattern may be generated. In such a case, the same data as before is used because the same benchmark testing does not need to be performed. In the present embodiment, code patterns and their processing times are stored in the storage section 13.

Emulator Environment

Depending on a program or a compilation environment, it may take long time to compile and run the program on an actual FPGA device. Therefore, simplified processing testing using an emulator environment may be used in combination. Therefore, it is preferable to consider using the following methods (1) and (2) in combination, rather than performing verification on the actual device every time.

(1) Simplified performance testing is used in an emulator environment in the GA stage and the final results are verified on the actual device.

(2) When a gene pattern identical to a former gene pattern is generated in the course of the GA, verification is performed in the emulator environment, thereby reducing the number of verification times on the actual device.

The concept of the search process by the control section (automatic offloading function section) 11 using Simple GA has been described above. A collective processing technique for data transfer will be described next.

[Collective Processing Technique for Data Transfer]

As described above, extraction of loop statements for which FPGA processing is effective is automatically tuned by using a genetic algorithm. However, the performance of some applications cannot be improved by data transfer between a CPU memory and an FPGA memory. Therefore, it is difficult for an unskilled user to improve the performance of an application by using a GPU or an FPGA. In addition, in some cases, the use of an automatic parallelization technique or the like requires trial-and-error determination as to whether to parallelize and there are cases in which acceleration is not possible.

In view of this, the present embodiment provides a technique that can achieve automatic offloading to an FPGA for which acceleration by automatic offloading is difficult.

Basic Concept

Parallel processing or pipeline processing on the FPGA is specified for iteration statements by using a high-level synthesis tool including OpenCL and the statements are compiled.

APPLICATION EXAMPLE 1

The process will be described below in detail. The types of data transfer include data transfer from CPU to FPGA and data transfer from FPGA to CPU.

Figure 6:
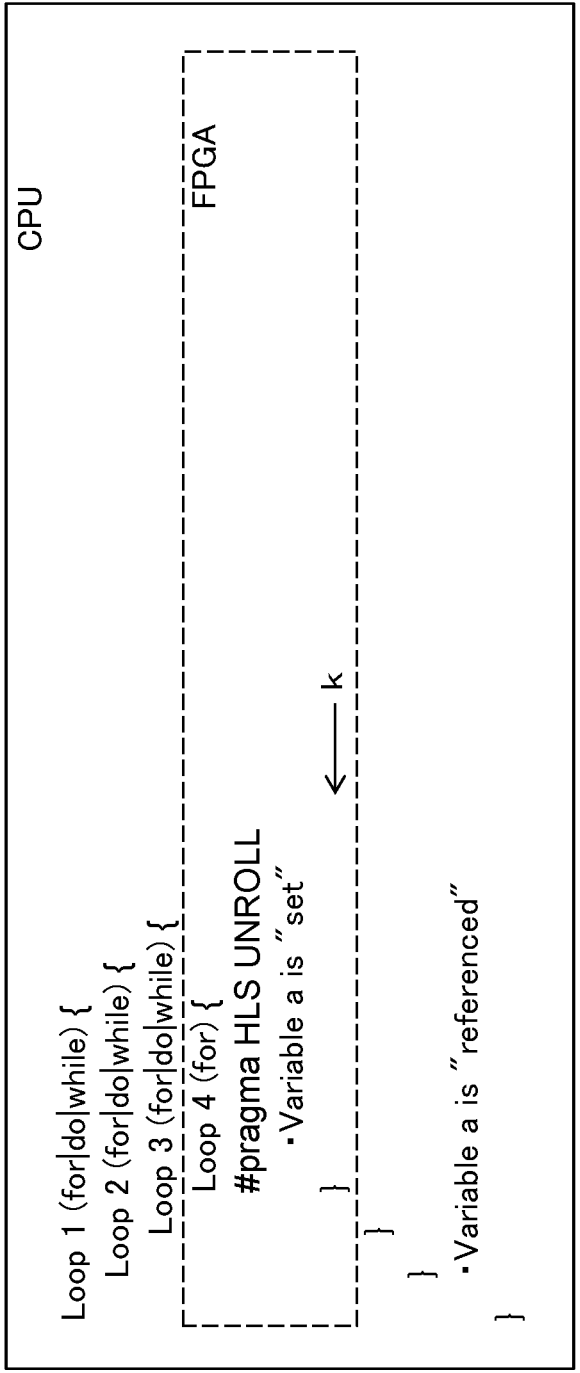
FIG. 6 is a diagram illustrating an exemplary case of loop statements involving an FPGA-to-CPU data transfer in an application example 1 of the offload server according to the embodiment, in which loop statements a variable set on the FPGA program side is referenced by the CPU program side.

FIGS. 5 and 6 are diagrams illustrating loop statements (iteration statements) in the source code of an application processed by an automatic offloading function section in application example 1, and are examples in which a variable defined on the CPU program side is referenced by the FPGA program side.

The automatic offloading function section in application example 1 is an example of the control section (automatic offloading function section) 11 in FIG. 2 that does not execute the data transfer designation section 113.

<<Data Transfer from CPU to FPGA in Application Example 1>>

FIG. 5 illustrates an exemplary case of loop statements involving a CPU-to-FPGA data transfer in the application example 1, in which loop statements a variable set on the CPU program side is referenced by the FPGA program side. Incidentally, numbers 1 to 4 indicated after loop statements denoted in the succeeding descriptions and in FIG. 5 are given for the sake of convenience of explanation (the same applies to other figures and explanations thereof).

The loop statements in the comparative example illustrated in FIG. 5 are written in the CPU program side, where:

Loop 1 (for|do|while) {
}
contains
    Loop 2 (for|do|while) {
    } which contains
    Loop 3 (for|do|while) {
    }
which contains
    Loop 4 (for){
    }.
    In addition, in Loop 1 (for|do|while) {
}, a variable a is set, and in Loop 4 (for|do|while) {
}, the variable a is referenced.
    Further, in Loop 4 (for) {
}, a processing portion such as for statements that can be parallelized by PGI compiler is designated with a directive #pragma HLS UNROLL (statement specifying parallel processing) (details described later) of OpenCL in the case of FPGA.

According to the loop statements of the application example 1 illustrated in FIG. 5, a CPU-to-FPGA data transfer occurs every time at timing indicated by reference character j in FIG. 5. Therefore, there is a demand to reduce the number of data transfers to FPGA.

<<Data Transfer from FPGA to CPU in Application Example 1>>

FIG. 6 illustrates loop statements of a comparative example involving an FPGA-to-CPU data transfer, in which loop statements a variable set on the FPGA program side is referenced by the CPU program side.

The loop statements in the comparative example illustrated in FIG. 6 are written on the CPU program side, where:

Loop 1 (for|do|while) {
}
contains
    Loop 2 (for|do|while) {
    }
which contains
    Loop 3 (for|do|while) {
    }
which contains
    Loop 4 (for) {
    }.
    In addition,
in Loop 4 (for) {
}, a variable a is set, and in Loop 1 (for|do|while) {
} the variable a is referenced.
    Further, in Loop 4 (for) {
}, a processing portion such as for statements that can be parallelized by PGI compiler is designated with a directive #pragma HLS UNROLL (statement specifying parallel processing) (details described later) of OpenCL in the case of FPGA.

According to the loop statements of the application example 1 illustrated in FIG. 6, an FPGA-to-CPU data transfer occurs every time at timing indicated by reference character k in FIG. 6. Therefore, there is a demand to reduce the number of data transfers to CPU.

In this way, by specifying parallel processing on the FPGA by the OpenCL directive #pragma HLS UNROLL, automatic offloading to the FPGA can be achieved.

APPLICATION EXAMPLE 2

Next, a description will be given of a collective data transfer processing technique by an offload server 1 in an application example 2.

In the case of the application example 1 described above, although it is possible to search for loop statements appropriate for offloading, applications that can be accelerated are limited because of inefficiency due to the CPU-FPGA data transfer that occurs at every loop iteration or because offloading does not improve the speed.

In application example 2, in order to reduce inefficient data transfers, data transfer operations are specified using an explicit instruction line in combination with extraction of parallel processing using a GA. Specifically, in application example 2, for each individual generated by the GA, reference relationships of the variable data used in loop statements are analyzed. Then, for data that can be transferred outside a loop, a data transfer outside the loop is explicitly specified, rather than transferring the data at every loop iteration.

According to the specifications of high-level synthesis tools, an instruction line that explicitly specifies data transfer between a CPU and an FPGA (hereinafter referred to as "explicit instruction line") is defined in addition to instruction lines that specify pipeline processing and parallel processing on an FPGA. The explicit instruction line is a directive (an instruction/specification command with a special symbol at the beginning of the line) to transfer data between a CPU and an FPGA, such as "#pragma SDS data copy".

Figure 7:
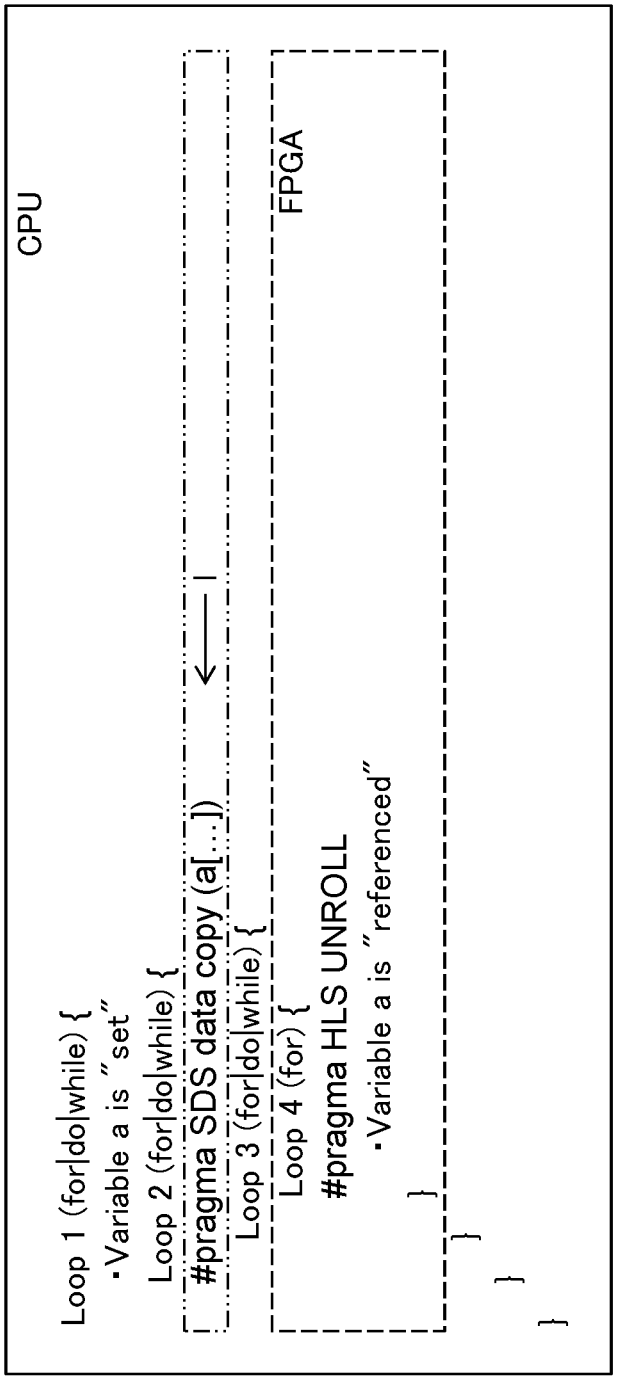
FIG. 7 is a diagram illustrating an exemplary case of loop statements involving a CPU-to-FPGA data transfer in an application example 2 of the offload server according to the embodiment, in which loop statements a variable defined on the CPU program side is referenced by the FPGA program side.
Figure 8:
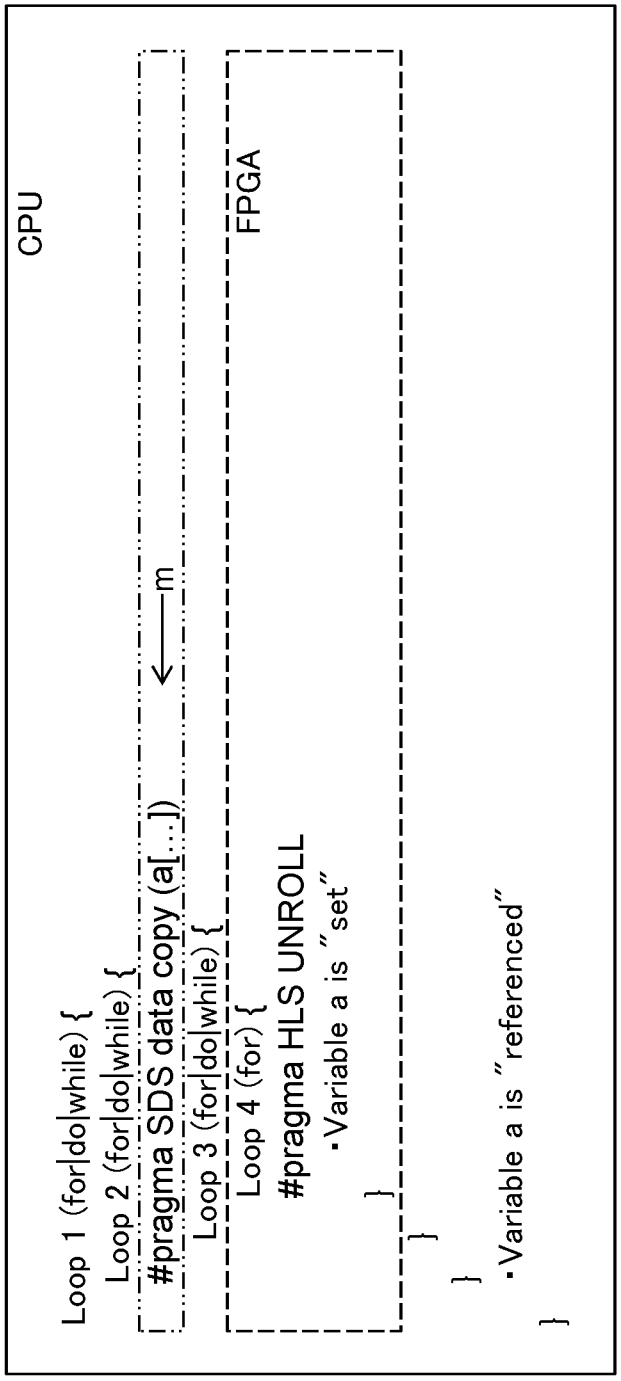
FIG. 8 is a diagram illustrating an exemplary case of loop statements involving an FPGA-to-CPU data transfer in the application example 2 of the offload server according to the embodiment, in which loop statements a variable set on the FPGA program side is referenced by the CPU program side.
Figure 10:
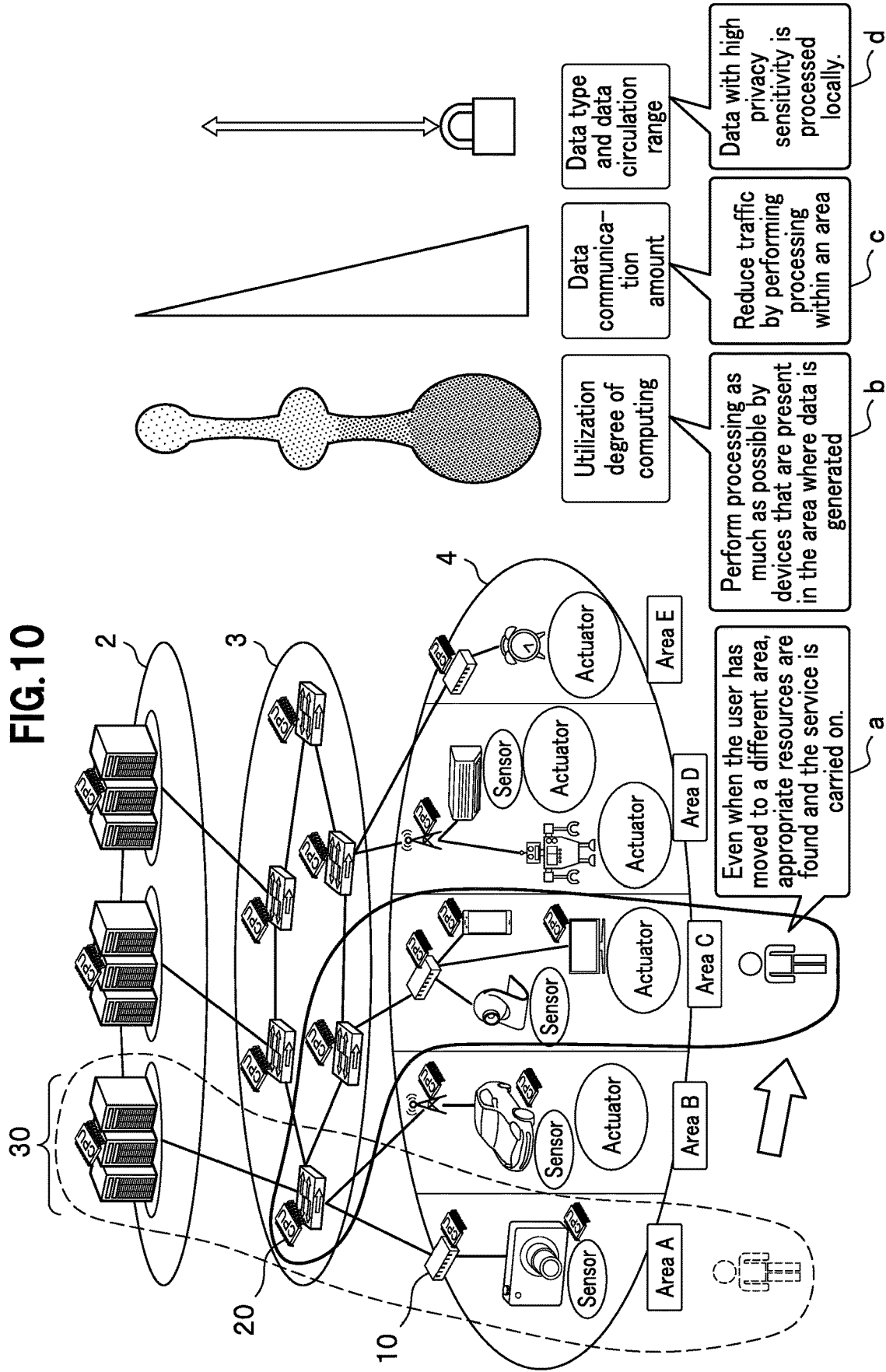
FIG. 10 is an explanatory view for explaining an overview of environment adaptive software.

FIGS. 7 and 8 are diagrams illustrating loop statements in the source code of an application processed by the automatic offloading function section in application example 2, and are examples in which a variable defined on the CPU program side is referenced by the FPGA program side.

The control section (automatic offloading function section) (see FIG. 2) in application example 2 uses a data transfer designation section 113.

<<Data Transfer from CPU to FPGA in Application Example 2>>

In application example 2, when a variable set or defined on the CPU program side is referenced by the FPGA program side, the need of a CPU-to-FPGA data transfer is recognized and a data transfer designation is performed.

The position where the data transfer is specified is at the loop to be processed on the FPGA or at an outer loop thereof which is the outermost loop that includes neither reference, setting, nor definition of the variable. (see FIG. 7). A data transfer instruction line is inserted immediately after a loop such as a for, do, or while loop.

FIG. 7 illustrates an example having loop statements involving a CPU-to-FPGA data transfer, in which loop statements a variable set on the CPU program side is referenced by the FPGA program side. FIG. 7 corresponds to the application example 1 illustrated in FIG. 5.

The loop statements in the present embodiment illustrated in FIG. 7 are written in the CPU program side, where:

Loop 1 (for|do|while) {
}
contains
   Loop 2 (for|do|while) {
   }
which contains
   Loop 3 (for|do|while) {
   }
which contains
     Loop 4 (for){
     }.
     Further, in Loop 1 (for|do|while) {
}, a variable a is set, and in Loop 4 (for) {
}, the variable a is referenced.

-continued

Further, in Loop 4 (for) {
}, a processing portion such as for statements that can be parallelized by PGI compiler is designated with a directive of OpenCL for FPGA: #pragma HLS UNROLL.

In the loop statements of application example 2 illustrated in FIG. 7, the data transfer instruction line: #pragma SDS data copy (a[. . . ]), a copy clause of variable a, is further inserted at the position indicated by reference character 1 in FIG. 7.

The aforementioned #pragma SDS data copy (a[. . . ]) is specified at the outermost loop including neither setting nor definition of the variable a (in this case, in Loop 2 (for-|do|while)), and the insertion position is immediately after a loop such as a for, do, or while loop.

In this way, in data transfer from the CPU to the FPGA, data transfer is explicitly indicated by inserting a copy clause of variable a: #pragma SDS data copy (a[. . . ]), at the position described above. This allows data transfers to be collectively performed at a time at the outermost possible loop, thereby avoiding inefficient transfer in which data is transferred at every loop iteration as in the comparative example indicated by reference character j in FIG. 5.

<<Data Transfer from FPGA to CPU in Application Example 2>>

In application example 2, when a variable set on the FPGA program side is one referenced, set, or defined by the CPU program side or the variable is a global variable (a variable directly accessible from all the functions), the need of an FPGA-to-CPU data transfer is recognized and a data transfer designation is performed The position where the data transfer is specified is at the loop to be processed on the FPGA or at an outer loop thereof which is the outermost loop that includes neither reference, setting, nor definition of the variable (see FIG. 8). A data transfer instruction line is inserted immediately after a loop such as a for, do, or while loop.

The condition regarding "setting" is included to take into account cases in which the setting may or may not be performed according to a statement such as an if statement (see FIG. 9 described later). In addition, the condition regarding "definition" on the CPU side is included to provide a guard against exceeding beyond the scope of the variable. The condition regarding global variables is included because global variables are possibly "referenced" outside the source code to be analyzed.

FIG. 8 illustrates an exemplary case of loop statements involving an FPGA-to-CPU data transfer, in which a variable referenced on the CPU program side is set by the FPGA program side. FIG. 8 corresponds to the application example 1 illustrated in FIG. 6.

The loop statements illustrated in FIG. 8 are written in the CPU program side, where:

Loop 1 (for|do|while) {
}
contains
   Loop 2 (for|do|while) {
   }
which contains
   Loop 3 (for|do|while) {
   }

```
    which contains
        Loop 4 (for){
        }.
    Further, in Loop 4 (for) {
}, variable a is set, and in Loop 2 (for|do|while) {
}, the variable a is referenced.
    Further, in Loop 4 (for) {
}, a processing portion such as for statements that can be
parallelized by PGI compiler is designated with a directive of
OpenCL for FPGA: #pragma HLS UNROLL.
```

In the loop statements of the application example 2 illustrated in FIG. 8, the data transfer instruction line #pragma SDS data copy (a[. . . ]), a copy clause of the variable a, is inserted at the position indicated by reference character m in FIG. 8.

The aforementioned #pragma SDS data copy (a[. . . ]) is specified at the outermost loop including neither reference, setting, nor definition of the variable a (in this case, in Loop 1 (for|do|while)), and the insertion position is immediately after a loop such as a for, do, or while loop.

The copy operation described above is executed after the end of the loop, as indicated by reference character m in FIG. 8.

In this way, in data transfer from the FPGA to the CPU, data transfer is explicitly indicated by inserting a copy clause of variable a: #pragma SDS data copy (a[. . . ]) at the position described above. This allows data transfers to be collectively performed at a time at the outermost possible loop, thereby avoiding inefficient transfer in which data is transferred at every loop iteration as in the application example 1 indicated by reference character k in FIG. 6.

As described in comparison with the application example 1 illustrated in FIGS. 5 to 8, the application example 2 explicitly specifies a data transfer so that the data transfer is collectively performed at a time at the outermost possible loop, thereby avoiding ineffective data transfer such that data is transferred at every loop iteration.

[FPGA Offload Processing]

By the above-described collective data transfer processing technique, loop statements appropriate for offloading can be extracted, and inefficient data transfer can be avoided.

However, some programs are not suitable for being offloaded to an FPGA using the collective data transfer processing technique described above. In order for offloading to an FPGA to be effective, it is necessary that the number of loop iterations of the processing to be offloaded be large.

Therefore, in application example 2, the number of loop iterations is checked using a profiling tool in a preliminary step before a full-scale offload processing finding operation. As the number of executions of each line can be checked using a profiling tool, programs can be sorted out beforehand so that, for example, programs that have more than 50 million loop iterations are selected as programs to which an offloadable processing finding operation is to be applied. The process will be described below in detail (some portions of the description overlap portions of the description given with reference to FIG. 4).

In application example 2, first an application in which offloadable processing portions are to be searched for is analyzed to identify loop statements such as for, do, and while statements. Then, sample processing is performed, and the number of iterations of each loop statement is checked using the profiling tool and determination is made as to whether to perform a full-scale offloadable processing portion finding operation, based on whether there are loops that iterate a predetermined number of times or more.

When it is determined that a full-scale search operation is to be performed, GA processing is started (see FIG. 4 described above). In the initialization step, all loop statements in the application code are checked to determine whether they are parallelizable, then parallelizable loop statements are mapped to a gene sequence by setting 1 if FPGA processing is to be performed and setting 0 if FPGA processing is not to be performed. The genes are prepared for a specified number of individuals in such a manner that the values of each individual are each assigned a value of 1 or 0 randomly.

Here, in the code corresponding to a gene, an explicit data transfer instruction line (#pragma SDS data copy) is added according to the reference relationships of variable data in the loop statement designated as being subjected to FPGA processing.

In the evaluation step, the code corresponding to the gene is compiled, deployed to a verification machine, and executed on the verification machine. Then, a benchmark performance measurement is performed. A gene corresponding to a pattern with good performance is given a higher degree of fitness. In the code corresponding to the gene, a parallel processing instruction line (see reference character j in FIG. 5, for example) and a data transfer instruction line (see reference character l in FIG. 7 and reference character m in FIG. 8, for example) are inserted, as described above.

In the selection step, genes with high degree of fitness as many as the specified number of individuals are selected based on the degree of fitness. The present embodiment performs roulette-wheel selection based on the degree of fitness and elite selection of selecting the gene with the highest degree of fitness. In the crossover step, some of the genes are swapped between selected individuals at one point at a certain crossover rate Pc, thereby generating child individuals. In the mutation step, values of a gene of an individual are changed from 0 to 1 or 1 to 0 at a certain mutation rate Pm.

After the mutation step is finished and next-generation genes as many as the specified number of individuals are generated, explicit data transfer instructions are added as in the initialization step, and the evaluation, selection, crossover, and mutation steps are repeated.

Lastly, at the termination judgement step, the process is terminated after the process is repeated a number of times equal to a specified number of generations, the process is terminated and a gene with the highest degree of fitness is selected as the solution. With a code pattern having a highest performance corresponding to the gene with the highest degree of fitness, the deployment to the actual environment is performed anew to provide it to the user.

Overview of Operation of Implementation

An overview of operation of an implementation will be described.

For the implementation, the following process is performed.

Before starting the process in the later-described flowchart illustrated in FIGS. 9A and 9B, a C/C++ application to be accelerated and a benchmark testing tool for measuring the performance of the application are provided.

In the implementation, when a request for using the C/C++ application is received, the code of the C/C++ application is first analyzed to find for statements and identify a program structure regarding such as variable data used in the for statements. The implementation performs a syntax analysis using LLVM/Clang syntax analysis library (python binding of libClang) or the like.

In the implementation, in order to estimate the possibility of effectiveness of FPGA offloading on the application, benchmark testing is performed first and the number of loop iterations of the for statements identified in the syntax analysis is identified. For identifying the number of loop iterations, gcov of GNU coverage or the like is used. Known profiling tools include "GNU profiler (gprof)" and "GNU coverage (gcov)". Either one of these tools may be used since both tools can check the number of execution iterations of each line. Only an application that has more than 10 million loop iterations, for example, may be processed; the threshold value can be changed.

Implementations of General-purpose applications for CPU are not intended to be parallelized. Therefore, for statements for which FPGA processing itself cannot be performed need to be excluded first. For each of the for statements, insertion of #pragma HLS PIPELINE/ #pragma HLS UNROLL directive is tried to determine whether an error occurs during compilation. There are several types of compilation errors. Examples of the compilation errors include: a case in which an external routine is called in a for statement; a case in which different nesting levels are duplicatively specified in nested for statements; a case in which there is a process that exits a for statement in the middle due to a break or the like; and a case in which there is a data dependency in data of a for statement. Types of errors that occur during compilation vary from application to application and errors other than discussed above may occur. Compile errors are excluded from the processing and #pragma directives are not inserted.

Here, when the number of loop statements at which no error occurs even when processed in parallel is A, the gene length is 2A. Value 1 of an odd number gene is associated with the presence of a pipeline processing directive, value 1 of an even number gene is associated with the presence of a parallelization processing directive, value 0 is associated with the absence of these directives, and the application code is mapped to genes each having a length of 2A.

Then, gene sequences as many as a specified number of individuals are provided as initial values. Values of genes are generated by randomly allocating 0's and 1's as described with reference to FIG. 4. According to the provided gene sequence, the directive #pragma HLS PIPELINE or #pragma HLS UNROLL which specifies pipeline processing or parallelization processing, respectively, is inserted in portions having the gene value 1 in the C/C++ code. At this stage, in a code corresponding to a certain gene, a portion to be processed by the FPGA is determined. Based on the reference relationships analyzed by the above-mentioned Clang regarding the variable data in for statements, directives for data transfers between CPU and FPGA are specified in accordance with the above-described rules.

Specifically, variables that require data transfers between CPU and FPGA are designated using #pragma SDS data copy (see FIGS. 7 and 8).

The C/C++ code into which the parallel processing directives and data transfer directives are inserted is compiled by a compiler designed for FPGA on a machine equipped with an FPGA. The compiled execution file is deployed and the performance of the execution file is measured using a benchmark testing tool.

For all the individuals, after benchmark performance measurement is performed, a degree of fitness is set for each gene sequence in accordance with its benchmark processing time. In accordance with the set degree of fitness, individuals to be left are selected. The selected individuals are subjected to the GA processing of crossover, mutation, and faithful copy processes, to generate a group of individuals of the next generation.

For the next-generation individuals, insertion of directives, compilation, performance measurement, setting of degree of fitness, selection, crossover, and mutation processes are performed. When a gene that has a pattern identical to a former pattern is generated in the GA processing, the compilation and performance measurement are not performed for the individual and the same measurement value as before is used.

After the GA process has been completed for a specified number of generations, the C/C++ code in which directives have been added and which corresponds to the gene sequence with the highest performance is selected as the solution.

In the above-described processes, the number of individuals, the number of generations, the crossover rate, the mutation rate, setting of the degree of fitness, and the selection method are parameters of the GA and are specified separately. The proposed technique automates the above-described processes to enable automation of FPGA offloading, which conventionally requires time and skill of specialized engineers.

FIGS. 9A and 9B are flowcharts for explaining an overview of operation of the implementation described above. FIGS. 9A and 9B are connected through a connector.

The following processing is performed using a compiler designed for C/C++.

Analyzing Code

At step 5101, the application code analysis section 112 (see FIG. 2) analyzes the code of the C/C++ application.

Identifying Loop Statements

At step S102, the PLD processing designation section 114 (see FIG. 2) identifies loop statements and reference relationships in the C/C++ application.

Parallelizability of Loop Statements

At step S103, the PLD processing designation section 114 checks each loop statement to determine whether or not the loop statement can be parallelized (#pragma HLS UNROLL) and pipelined (#pragma HLS PIPELINE).

Repeating Loop Statements

The control section (automatic offloading function section) 11 repeats the processes from step S105 to step S106 between the beginning of the loop at step 5104 and the end of the loop at step S107 as many times as the number of the loop statements.

At step S105, the PLD processing designation section 114 specifies parallel processing (#pragma HLS UNROLL)/ pipeline processing (#pragma HLS PIPELINE) for each loop statement using a high-level synthesis tool, and perform compilation.

At step S106, the PLD processing designation section 114 removes #pragma from the for statement when an error occurs.

At step S108, the PLD processing designation section 114 counts for statements at which no compilation error occurs and sets a gene length twice the number of the loop statements at which no compilation error occurs.

Providing Patterns as many as a Specified Number of Individuals

Next, the PLD processing designation section 114 provides, as initial values, gene sequences as many as a specified number of individuals. Here, the gene sequences are generated by randomly assigning 0's and 1's.

At step S109, the PLD processing designation section 114 provides as many patterns as the specified number of individuals by mapping the C/C++ application code to the genes.

According to the provided gene sequences, a directive that specifies parallel processing is inserted in the C/C++ code when the value of a gene is 1 (see #pragma HLS UNROLL directive in FIG. 4, for example).

The control section (automatic offloading function section) 11 repeats the processes from step S111 to step S118 between the beginning of the loop at step S110 and the end of the loop at step S119 as many times as a specified number of generations.

Further, in the repetitions as many times as the specified number of generations, the processes from step S112 to step S115 are repeated between the beginning of the loop at step S111 and the end of the loop at step S116 as many times as the specified number of individuals. In other words, the repetitions as many times as the specified number of individuals are performed in a nested manner in the iterations as many times as the specified number of generations.

Specifying Data Transfer

At step S112, based on variable reference relationships, the data transfer designation section 113 performs a data transfer designation using an explicit instruction line (#pragma SDS data copy) based on the variable reference relationships. Data transfer specification using the explicit instruction line (#pragma SDS data copy) has been described with respect to FIGS. 5 to 8.

Compilation

At step S113, the PLD processing pattern generation section 115 (see FIG. 2) compiles the C/C++ code in which directives are specified in accordance with the gene pattern by using a high-level synthesis tool. Specifically, the PLD processing pattern generation section 115 compiles the generated C/C++ code using a compiler designed for FPGA on a verification machine 14 equipped with an FPGA.

Here, a compilation error can occur for example when a plurality of nested for statements are specified for parallelization. Such a case is handled in the same way as a timeout of processing time during performance measurement.

At step S114, the performance measurement section 116 (see FIG. 2) deploys the execution file to the verification machine 14 equipped with a CPU and an FPGA.

At step S115, the performance measurement section 116 executes the deployed binary file and measures benchmark performance obtained when offloading is performed.

Here, the measurement is not performed on a gene in an intermediate generation that has the same pattern as a gene in a former generation and the same value is used. In other words, when a gene that has a pattern identical to a former pattern is generated in the GA processing, the compilation and performance measurement are not performed for the individual and the same measurement value as before is used.

At step S117, the execution file generation section 117 (see FIG. 2) evaluates individuals in such a manner that an individual that results in a shorter processing time is given a higher degrees of fitness, and selects high-performance individuals.

At step S118, the execution file generation section 117 performs crossover and mutation processes on the selected individuals to generate next-generation individuals. The execution file generation section 117 performs compilation, performance measurement, setting of degree of fitness, selection, crossover, and mutation processes on the next-generation individuals.

Specifically, for all the individuals, after benchmark performance measurement is performed, a degree of fitness is set for each gene sequence in accordance with its benchmark processing time. In accordance with the set degree of fitness, individuals to be left are selected. The selected individuals are subjected to the GA processing of crossover, mutation, and faithful copy processes, to generate a group of individuals of the next generation.

At step S120, after the completion of the GA processing of a specified number of generations, the execution file generation section 117 selects C/C++ code that corresponds to the highest-performance gene sequence (highest-performance PLD processing pattern) as the solution.

Parameters of GA

The number of individuals, the number of generations, the crossover rate, the mutation rate, setting of the degree of fitness, and the selection method described above are parameters of GA. The parameters of the GA may be set as follows, for example.

For example, parameters and conditions of Simple GA performed may be set as follows.

Gene length: The number of parallelizable loop statements

Number of individuals M: A number less than or equal to the gene length

Number of generations T: A number less than or equal to the gene length

Degree of fitness: (Processing time)$^{(-1/2)}$

With these settings, the shorter the benchmark processing time, the higher the degree of fitness will become. Further, by setting the degree of fitness to processing time raised to the minus one-half power, it is possible to prevent a situation such that an excessively high degree of fitness is given to a certain individual whose processing time is short and thus the search range is narrowed. Further, when the performance measurement does not end within a certain period of time, the measurement is timed out and the degree of fitness is calculated by judging the processing time as being a processing time of 1000 seconds or the like (a long time). The timeout period may be varied in accordance with performance measurement characteristics.

Selection:Roulette-wheel selection

However, elite preservation, in which a gene with the highest degree of fitness in a generation is preserved in the next generation without being subjected to crossover and mutation processes, is also performed.

Crossover rate Pc: 0.9

Mutation rate Pm: 0.05

In the present embodiment, applications requiring a large execution time due to a large number of loop iterations are identified in advance using gcov and/or gprof or the like and the offloading is executed for trial. In this manner, it is possible to find applications that can be efficiently accelerated.

As has been described above, the offload server 1 according to the present embodiment includes: an application code analysis section 112 configured to analyze the source code of an application; a data transfer designation section 113 configured to analyze reference relationships between variables used in loop statements in the application and, for data that can be transferred outside a loop, perform a data transfer designation using an explicit instruction line that explicitly specifies a data transfer outside the loop; a PLD processing designation section 114 configured to specify parallel processing (for example #pragma HLS UNROLL) or pipeline processing (for example #pragma HLS PIPELINE) on a PLD using a high-level synthesis tool including OpenCL, and perform compilation; and a PLD processing pattern generation section 115 configured to exclude, from loop statements to be offloaded, any loop statement at which a compilation error occurs and to generate a plurality of PLD processing patterns each of which specifies whether to perform PLD processing for each of the loop statements at which no compilation error occurs. The offload server 1 further includes a performance measurement section 116 configured to compile an application according to a PLD processing pattern, deploy the compiled application to a verification machine 14, and perform processing for measuring the performance obtained when offloading the compiled application to the PLD according to the PLD processing pattern, and an execution file generation section 117 configured to select a PLD processing pattern with a highest processing performance from the plurality PLD processing patterns on the basis of a result of performance measurements and compile the application according to the PLD processing pattern with the highest processing performance to generate an execution file.

This configuration can improve overall processing ability by automatically offloading specific processing of an application to a PLD while reducing the number of data transfers between the CPU and the FPGA. With this configuration, even a user not having the skill of using OpenCL or the like can perform high-performance processing using an FPGA. Further, it is possible to improve the performance of general-purpose, CPU-based applications for which performance improvement using an FPGA has not been considered. Moreover, offloading to an FPGA of a general-purpose machine that is not a high-performance computation server is enabled.

Further, in technologies such as environment adaptive software, an application (cryptography processing, image processing and the like) that is used for general purposes in IoT for users can be offloaded to a PLD in a short time. With this, it is possible to reduce the number of servers, such as virtual machines, that makes a CPU run, and, as a result, reduce the cost.

For example, as illustrated in FIG. 1, the offload server 1 can take into account all the three layers (device layer, network layer, and cloud layer) and deploy the function to the most suitable layer and secure resources. With this, the offload server 1 can provide the service desired by users continuously and reasonably.

In the present embodiment, the data transfer designation section 113 analyzes reference relationships between variables used in loop statements in the application and, for data that can be transferred outside a loop, performs a data transfer designation using an explicit instruction line (#pragma SDS data copy (a [ . . . ]), where a is a variable) that explicitly specifies a data transfer outside the loop.

With this configuration, data transfer designations using explicit instruction lines are performed in combination with the extraction of parallel processing using a GA. This makes it possible to reduce the number of CPU-to-FPGA data transfers and the number of FPGA-to-CPU data transfers.

With this configuration, data transfer is explicitly specified so as to be collectively performed at a time at the outermost possible loop, thereby avoiding ineffective data transfer such that data is transferred at every loop iteration.

In the present embodiment, the data transfer designation section 113 is configured to, when a variable defined on the CPU program side is to be referenced by the FPGA program side, specify a CPU-to-FPGA data transfer at the loop to be processed on the FPGA or at an outer loop thereof which is the outermost loop that includes neither setting nor definition of the variable. Further, the data transfer designation section 113 is configured to, when a variable set in the FPGA program side is to be referenced by the CPU program side, specify an FPGA-to-CPU data transfer at the loop to be processed on the FPGA or at an outer loop thereof which is the outermost loop that includes neither reference, setting, nor definition of the variable.

With this configuration, when a CPU-to-FPGA transfer and an FPGA-to-CPU transfer are both to be performed on the same variable, they are collectively specified as data copies in the both directions, thereby further effectively avoiding ineffective data transfer such that data is transferred at every loop iteration.

The offload server 1 according to the present embodiment includes an actual environment deployment section 118 configured to deploy the generated execution file to an actual environment for the user.

With this configuration, even a user not having the skill of using OpenCL or the like can perform high-performance processing using an FPGA.

The offload server 1 according to the present embodiment includes: a storage section 13 configured to store a test case DB 131 that stores performance test items; and a performance measurement test extraction and execution section 119 configured to, after the execution file has been deployed, extract performance test items from the test case DB 131 and perform a performance test.

With this configuration, performance test items can be tested by performing a performance test of automatic offloading.

In the present embodiment, the PLD processing designation section 114 includes: an offload area extraction section 114a configured to identify processing offloadable to an accelerator and extract an intermediate language according to offload processing; an intermediate language file output section 114b configured to output an intermediate language file 132. In the present embodiment, a binary file deployment section 116a is provided that is configured to deploy an execution file derived from an intermediate language to a verification machine 14. The deployed binary file is executed, the performance obtained when offloading is performed is measured, results of the performance measurement is returned to the offload area extraction section 114a, and the offload area extraction section 114a extracts other PLD processing patterns. Further, the intermediate language file output section 114b is further configured to carry out a performance measurement for trial using an extracted intermediate language. Further, the execution file generation section 117 is configured to select a PLD processing pattern with a highest processing performance from the plurality of PLD processing patterns generated by the PLD processing pattern generation section 115 and the another PLD processing pattern extracted by the offload area extraction section 114a, on the basis of results of the performance measurement repeated for a predetermined number of times and to compile the application according to the PLD processing pattern with the highest processing performance to generate an execution file.

With this configuration, an execution file derived from an intermediate language can be deployed by extracting an intermediate language corresponding to offload processing and outputting an intermediate language file. Further, extraction of an intermediate language and deployment of an execution file can be repeated to search for appropriate offload areas. This enables appropriate offload areas to be automatically extracted from a general-purpose program which does not assume parallelization.

In the present embodiment, the execution file generation section 117 repeats a performance measurement on the verification machine 14 while the application is actually being used, selects the PLD processing pattern with the highest processing performance, compiles the application according to the PLD processing pattern with the highest processing performance to generate the execution file, and deploys the execution file to an actual use environment at a predetermined timing.

With this configuration, an execution file with a highest processing performance can be deployed to an actual environment to be actually provided to a user and can be provided as a service. Thus, user satisfaction can be increased.

In the present embodiment, the PLD processing designation section 114 is configured to use twice the number of the loop statements at which no compilation error occurs as a gene length, according to a genetic algorithm. The PLD processing pattern generation section 115 is configured to prepare gene patterns as many as the specified number of current-generation individuals, wherein each of the gene patterns has elements whose values are each randomly assigned a value of 1 or 0 and application/non-application of PLD processing is mapped to the value in such a manner that performing PLD processing is assigned either 1 or 0 and not performing PLD processing is assigned either the opposite 0 or 1. The performance measurement section 116 is configured to: according to each of the current-generation individuals, compile an application code in which statements specifying application of parallel processing by the PLD are specified, deploy the compiled code to the verification machine 14, and perform processing for the measurement of the performance on the verification machine 14. The execution file generation section 117 is configured to perform performance measurement for all the individuals, evaluate the individuals in such a manner that an individual that requires less processing time period is regarded as having a higher degree of fitness, select individuals having degrees of fitness higher than a predetermined value from all the individuals as individuals with high performances, generate next-generation individuals by performing crossover and mutation processes on the selected individuals, and after completing processing for a specified number of generations, select a PLD processing pattern with a highest performance as the solution.

With this configuration, the embodiment first checks parallelizable for statements and then, for a group of for statements that can be parallelized, repeatedly performs a performance verification trial on a verification environment using the GA to search for appropriate areas. By narrowing down to parallelizable for statements and then retaining and recombining accelerable PLD processing patterns in the form of portions of genes, a pattern that can be efficiently accelerated can be searched for from a huge number of possible PLD processing patterns.

In the present embodiment, when a gene having the same PLD processing pattern as a former gene appears in an intermediate generation, the performance measurement section 116 does not perform compilation of the application code corresponding to the PLD processing pattern and does not perform performance measurement and uses the same performance measurement value.

With this configuration, processing time can be reduced because compilation and measurement of a gene pattern that is the same as the former gene pattern are omitted.

In the present embodiment, for an application code that causes a compilation error and for an application code with which the performance measurement does not finish within a predetermined time, the performance measurement section 116 handles these cases as time-out cases and sets the performance measurement value to a predetermined time (a long time).

With this configuration, processing time can be reduced by adjusting the timeout period while leaving as many offloadable for statements as possible.

Among the processing described in the embodiment, all or some of the processing described as being performed automatically may be performed manually, or all or some of the processing described as being performed manually may be performed automatically using a known method. In addition, information including process procedures, control procedures, specific names, various types of data and parameters described and illustrated in the description and drawings may be changed as appropriate unless otherwise stated.

Further, the components of the devices illustrated in the drawings are functionally conceptual and do not necessarily need to be physically configured as illustrated. In other words, specific form of distribution and integration of the devices are not limited to those illustrated in the drawings and all or some of the devices can be distributed or integrated functionally or physically in any units according to various loads and usages.

Further, some or all of the configurations, functions, processing units, processing means and the like described above may be implemented in hardware by, for example, designing them in integrated circuits. Further, the configurations, functions and the like described above may be implemented in software that causes a processor to interpret and execute a program that implements the functions. The program that implements the functions and information such as tables and files can be held in a recording device such as a memory, a hard disk, or an SSD (Solid State Drive) or a recording medium such as an IC (Integrated Circuit) card, an SD (Secure Digital) card, or an optical disc.

Further, in the present embodiment, while a genetic algorithm (GA) technique is used in order to allow a solution to a combinational optimization problem to be found in a limited optimization period, any optimization technique may be used. For example, local search, Dynamic Programming, or a combination of both may be used.

Further, any mode may be used in the present embodiment as long as FPGA processing can be offloaded.

Further, while for statements have been taken as an example of iteration statements (loop statements) in the present embodiment, iteration statements include other statements such as while statements and do-while statements. However, for statements, which specify continuation conditions or the like for a loop, are more suitable.

REFERENCE SIGNS LIST

1 Offload server
11 Control section
12 Input/Output section
13 Storage section
14 Verification machine (accelerator verification device)
15 OpenIoT resource
111 Application code designation section
112 Application code analysis section
113 Data transfer designation section
114 PLD processing designation section
114a Offload area extraction section
114b Intermediate language file output section
115 PLD processing pattern generation section
116 Performance measurement section
116a Binary file deployment section
117 Execution file generation section
118 Actual environment deployment section
119 Performance measurement test extraction and execution section
120 Provision-to-user section
130 Application code
131 Test case DB
132 Intermediate language file
151 Various types of devices
152 CPU-GPU-equipped device
153 CPU-FPGA-equipped device
154 CPU-equipped device

The invention claimed is:

1. An offload server that offloads specific processing of an application to a PLD (Programmable Logic Device), the offload server comprising:
one or more hardware processors;
an application code analysis section, implemented using one of the one or more hardware processors, configured to analyze source code of an application;
a PLD processing designation section, implemented using one of the one or more hardware processors, configured to identify loop statements in the application, specify, for each of the identified loop statements, parallel processing or pipeline processing on the PLD by using a high-level synthesis tool, and perform compilation;
a PLD processing pattern generation section, implemented using one of the one or more hardware processors, configured to exclude, from loop statements to be offloaded, any loop statement at which a compilation error occurs and to generate a plurality of PLD processing patterns each of which specifies whether to perform PLD processing for each of the loop statements at which no compilation error occurs;
a performance measurement section, implemented using one of the one or more hardware processors, configured to, for each of the plurality of PLD processing patterns, compile the application according to the PLD processing pattern, deploy the compiled application to an accelerator verification device, and perform processing for a measurement of a performance obtained when offloading the compiled application to the PLD according to the PLD processing pattern; and
an execution file generation section, implemented using one of the one or more hardware processors, configured to select a PLD processing pattern with a highest processing performance as a solution from the plurality of PLD processing patterns on the basis of a result of the measurement of the performance, and compile the application according to the PLD processing pattern with the highest processing performance to generate an execution file.

2. The offload server according to claim 1, further comprising a data transfer designation section, implemented using one of the one or more hardware processors, configured to analyze reference relationships between variables used in the loop statements in the application and, for data that can be transferred outside a loop, perform a data transfer designation using an explicit instruction line that explicitly specifies a data transfer outside the loop,
wherein the data transfer designation section is further configured to perform a data transfer designation using an explicit specification line that explicitly specifies data transfer between a CPU (Central Processing Unit) and the PLD.

3. The offload server according to claim 2,
wherein the data transfer designation section is further configured to, when a variable defined on a CPU program side is to be referenced by a PLD program side, specify a data transfer from a CPU to the PLD at the loop to be processed on the PLD or at an outer loop thereof which is an outermost loop that includes neither setting nor definition of the variable, and
wherein the data transfer designation section is further configured to, when a variable set on the PLD program side is to be referenced by the CPU program side, specify a data transfer from the PLD to the CPU at the loop to be processed on the PLD or at an outer loop thereof which is an outermost loop that includes neither reference, setting, nor definition of the variable.

4. The offload server according to claim 1, further comprising:
a storage section, implemented using one of the one or more hardware processors, configured to include a test case database storing performance test items; and
a performance measurement test extraction and execution section, implemented using one of the one or more hardware processors, configured to, after the execution file has been deployed to an actual environment for a user, extract performance test items from the test case database and execute a performance test.

5. The offload server according to claim 1, wherein the PLD processing designation section comprises:
an offload area extraction section, implemented using one of the one or more hardware processors, configured to identify processing offloadable to the PLD and extract an intermediate language corresponding to offload processing; and
an intermediate language file output section, implemented using one of the one or more hardware processors, configured to output an intermediate language file,
wherein the performance measurement section is further configured to: deploy an execution file derived from an intermediate language to the accelerator verification device, cause the accelerator verification device to execute the deployed binary file and to perform a measurement of a performance obtained when offloading is performed, and acquire a result of the measurement of the performance of the deployed binary file and return the result to the offload area extraction section,
wherein the offload area extraction section is further configured to extract another PLD processing pattern, wherein the intermediate language file output section is further configured to carry out a performance measurement for trial using the extracted intermediate language, and wherein the execution file generation section is further configured to: select a PLD processing pattern with a highest processing performance from the plurality of PLD processing patterns generated by the PLD processing pattern generation section and the another PLD processing pattern extracted by the offload area extraction section, on the basis of the result of the measurement of the performance obtained by repeating the performance measurement for a predetermined number of times; and compile the application according to the PLD processing pattern with the highest processing performance to generate the execution file.

6. The offload server according to claim 1, wherein the PLD processing designation section is further configured to set a gene length to twice the number of the loop statements at which no compilation error occurs, according to a genetic algorithm, wherein the PLD processing pattern generation section is further configured to prepare gene patterns as many as a specified number of current-generation individuals, wherein each of the gene patterns has elements whose values are each randomly assigned a value of 1 or 0 and application/non-application of PLD processing is mapped to the value in such a manner that performing PLD processing is assigned either 1 or 0 and not performing PLD processing is assigned either the opposite 0 or 1, wherein the performance measurement section is further configured to: for each of the current-generation individuals, compile an application code in which statements specifying application of parallel processing by the PLD are specified, deploy the compiled code to the accelerator verification device, and perform processing for a measurement of a performance of the individual on the accelerator verification device, and wherein the execution file generation section is further configured to perform performance measurement for all the individuals, evaluate the individuals in such a manner that an individual that requires less processing time period is regarded as having a higher degree of fitness, select individuals having degrees of fitness higher than a predetermined value from all the individuals as individuals with high performances, generate next-generation individuals by performing crossover and mutation processes on the selected individuals, and after completing processing for a specified number of generations, select a PLD processing pattern with a highest performance as the solution.

7. The offload server according to claim 6, wherein the offload server is connectable to an emulator, wherein the performance measurement section is further configured to, in a stage of the genetic algorithm, use a simplified performance test using the emulator and, when determining a final result, perform verification on an actual machine and to, when a gene pattern that is identical to a former gene pattern is generated in the course of the genetic algorithm, perform verification using the emulator, thereby reducing the number of verification operations on the actual machine.

8. A non-transitory computer-readable medium storing a computer program configured to cause an offload server to offload specific processing of an application to a PLD (Programmable Logic Device), the offload server comprising:

one or more hardware processors;

an application code analysis section, implemented using one of the one or more hardware processors, configured to analyze source code of an application;

a PLD processing designation section, implemented using one of the one or more hardware processors, configured to identify loop statements in the application, specify, for each of the identified loop statements, parallel processing or pipeline processing on the PLD by using a high-level synthesis tool, and perform compilation;

a PLD processing pattern generation section, implemented using one of the one or more hardware processors, configured to exclude, from loop statements to be offloaded, any loop statement at which a compilation error occurs and to generate a plurality of PLD processing patterns each of which specifies whether to perform PLD processing for each of the loop statements at which no compilation error occurs;

a performance measurement section, implemented using one of the one or more hardware processors, configured to, for each of the plurality of PLD processing patterns, compile the application according to the PLD processing pattern, deploy the compiled application to an accelerator verification device, and perform processing for a measurement of a performance obtained when offloading the compiled application to the PLD according to the PLD processing pattern; and an execution file generation section, implemented using one of the one or more hardware processors, configured to select a PLD processing pattern with a highest processing performance as a solution from the plurality of PLD processing patterns on the basis of a result of the measurement of the performance, and compile the application according to the PLD processing pattern with the highest processing performance to generate an execution file.

* * * * *